(12) United States Patent
Yoseloff

(10) Patent No.: US 9,373,220 B2
(45) Date of Patent: *Jun. 21, 2016

(54) METHODS OF PLAYING WAGERING GAMES AND RELATED APPARATUSES

(71) Applicant: Bally Gaming, Inc., Las Vegas, NV (US)

(72) Inventor: Mark L. Yoseloff, Henderson, NV (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/757,628

(22) Filed: Feb. 1, 2013

(65) Prior Publication Data

US 2013/0157752 A1 Jun. 20, 2013

Related U.S. Application Data

(63) Continuation-in-part of application No. 13/399,141, filed on Feb. 17, 2012, which is a continuation of application No. 11/108,159, filed on Apr. 15, 2005, now abandoned, which is a continuation-in-part of application No. 10/938,483, filed on Sep. 10, 2004, now Pat. No. 7,264,243.

(51) Int. Cl.
*A63F 13/00* (2014.01)
*G07F 17/32* (2006.01)
(Continued)

(52) U.S. Cl.
CPC .............. *G07F 17/3244* (2013.01); *A63F 1/00* (2013.01); *A63F 3/00157* (2013.01); *A63F 1/067* (2013.01);
(Continued)

(58) Field of Classification Search
CPC ..... G07F 17/322; G07F 17/3293; A63F 1/067; A63F 2001/005; A63F 2003/00167; A63F 2003/0017; A63F 3/00157; A63F 2001/008; A63F 2003/00164; A63F 13/00
USPC ........... 273/292, 274, 309, 138.2; 463/13, 12, 463/25, 26, 46
See application file for complete search history.

(56) References Cited

U.S. PATENT DOCUMENTS 1,238,736 A 9/1917 Barrett
1,527,929 A 2/1925 Simons
(Continued)

FOREIGN PATENT DOCUMENTS

AU 200135060 10/2001
DE 2830216 1/1980
(Continued)

OTHER PUBLICATIONS

"Over/Under 13 Blackjack" Brochure; Gaming Concepts, Inc. 1988.
(Continued)

*Primary Examiner* — Benjamin Layno
(74) *Attorney, Agent, or Firm* — TraskBritt

(57) ABSTRACT

Methods of administering wagering games may comprise receiving a first wager from each player. Cards comprising a partial hand, which may be three player cards available to respective players individually, may be dealt to each player. An election to fold or a second wager, which may be between one and four times an amount of the ante wager, at the player's option, to continue participation in the wagering game may be received from each player. Additional cards, which may be two community cards available to all players, may be dealt to complete the hand, which may be a five-card poker hand, of each player. The first and second wagers may be resolved and a payout may be paid on each of the first and second wagers to each player holding a complete hand of a predetermined rank, which may be a pair of jacks, or higher.

7 Claims, 7 Drawing Sheets

(51) Int. Cl.
*A63F 1/00* (2006.01)
*A63F 1/06* (2006.01)
*A63F 3/00* (2006.01)

(52) U.S. Cl.
CPC .......... *A63F 13/00* (2013.01); *A63F 2001/005* (2013.01); *A63F 2001/008* (2013.01); *A63F 2003/0017* (2013.01); *A63F 2003/00164* (2013.01); *A63F 2003/00167* (2013.01); *G07F 17/322* (2013.01); *G07F 17/3293* (2013.01)

(56) References Cited

U.S. PATENT DOCUMENTS

| | | |
|---|---|---|
| 1,763,476 A | 6/1930 | Morris |
| 1,970,876 A | 8/1934 | Anderson |
| 2,008,829 A | 7/1935 | Israel |
| 2,199,745 A | 5/1940 | Harris |
| 3,011,789 A | 12/1961 | Eliassen |
| 3,269,503 A | 8/1966 | Foster |
| 3,556,531 A | 1/1971 | Clarence |
| 3,663,021 A | 5/1972 | Whippo |
| 3,667,757 A | 6/1972 | Holmberg |
| 3,689,071 A | 9/1972 | Kucera |
| 3,796,433 A | 3/1974 | Bell et al. |
| 3,825,255 A | 7/1974 | Kennard |
| 3,876,208 A | 4/1975 | Wachtler et al. |
| 4,063,680 A | 12/1977 | Leo |
| 4,099,722 A | 7/1978 | Rodesch et al. |
| 4,232,866 A | 11/1980 | Pennachio |
| 4,302,012 A | 11/1981 | Di Giovanni et al. |
| 4,305,586 A | 12/1981 | Richards et al. |
| 4,364,567 A | 12/1982 | Goott et al. |
| 4,397,469 A | 8/1983 | Carter |
| 4,518,001 A | 5/1985 | Branham |
| 4,531,187 A | 7/1985 | Uhland et al. |
| 4,575,085 A | 3/1986 | Ollington |
| 4,614,342 A | 9/1986 | Takashima |
| 4,624,459 A | 11/1986 | Kaufman et al. |
| 4,648,604 A | 3/1987 | Horan et al. |
| 4,651,997 A | 3/1987 | Wood et al. |
| 4,700,948 A | 10/1987 | Okada |
| 4,721,307 A | 1/1988 | Okada |
| 4,743,022 A | 5/1988 | Wood |
| 4,756,531 A | 7/1988 | DiRe et al. |
| 4,759,549 A | 7/1988 | Beckwith et al. |
| 4,760,527 A | 7/1988 | Sidley |
| 4,813,675 A | 3/1989 | Greenwood et al. |
| 4,836,546 A | 6/1989 | DiRe et al. |
| 4,836,553 A | 6/1989 | Suttle et al. |
| 4,837,728 A | 6/1989 | Barrie et al. |
| 4,861,041 A | 8/1989 | Jones et al. |
| 4,948,134 A | 8/1990 | Suttle et al. |
| 4,964,638 A | 10/1990 | Ishida |
| 5,022,653 A | 6/1991 | Suttle et al. |
| 5,046,736 A | 9/1991 | Bridgeman et al. |
| 5,078,405 A | 1/1992 | Jones et al. |
| 5,098,107 A | 3/1992 | Boylan et al. |
| 5,100,137 A | 3/1992 | Fulton et al. |
| 5,112,060 A | 5/1992 | Jones et al. |
| 5,167,413 A | 12/1992 | Fulton et al. |
| 5,174,579 A | 12/1992 | Griffiths |
| 5,221,083 A | 6/1993 | Dote et al. |
| 5,242,163 A | 9/1993 | Fulton et al. |
| 5,251,897 A | 10/1993 | Fulton et al. |
| 5,255,915 A | 10/1993 | Miller |
| 5,257,784 A | 11/1993 | Boylan et al. |
| 5,257,810 A | 11/1993 | Schorr et al. |
| 5,265,877 A | 11/1993 | Boylan et al. |
| 5,275,415 A | 1/1994 | Wisted et al. |
| 5,288,077 A | 2/1994 | Jones et al. |
| 5,288,081 A | 2/1994 | Breeding et al. |
| 5,294,128 A | 3/1994 | Marquez et al. |
| 5,308,065 A | 5/1994 | Bridgeman et al. |
| 5,322,295 A | 6/1994 | Cabot et al. |
| 5,324,035 A | 6/1994 | Morris et al. |
| 5,337,973 A | 8/1994 | Matsumoto et al. |
| 5,364,104 A | 11/1994 | Jones et al. |
| 5,366,228 A | 11/1994 | Kangsanaraks et al. |
| 5,377,973 A | 1/1995 | Jones et al. |
| 5,377,993 A | 1/1995 | Josephs et al. |
| 5,377,994 A | 1/1995 | Jones et al. |
| 5,395,120 A | 3/1995 | Malek et al. |
| 5,397,128 A | 3/1995 | Hesse et al. |
| 5,411,257 A | 5/1995 | Fulton et al. |
| 5,417,430 A | 5/1995 | Breeding et al. |
| 5,423,551 A | 6/1995 | Stavinsky et al. |
| 5,431,408 A | 7/1995 | Adams et al. |
| 5,437,451 A | 8/1995 | Fulton et al. |
| 5,489,101 A | 2/1996 | Moody et al. |
| 5,494,295 A | 2/1996 | Potter et al. |
| 5,505,449 A | 4/1996 | Eberhardt et al. |
| 5,531,448 A | 7/1996 | Moody et al. |
| 5,538,252 A | 7/1996 | Green et al. |
| 5,584,486 A | 12/1996 | Franklin et al. |
| 5,597,162 A | 1/1997 | Franklin et al. |
| 5,630,757 A | 5/1997 | Gagin et al. |
| 5,636,842 A | 6/1997 | Cabot et al. |
| 5,649,705 A | 7/1997 | String et al. |
| 5,653,444 A | 8/1997 | Dahl et al. |
| 5,657,993 A | 8/1997 | Merlino et al. |
| 5,660,393 A | 8/1997 | Dreger et al. |
| 5,669,817 A | 9/1997 | Tarantino et al. |
| 5,673,917 A | 10/1997 | Vancura et al. |
| 5,685,774 A | 11/1997 | Webb et al. |
| 5,697,614 A | 12/1997 | Potter et al. |
| 5,711,525 A | 1/1998 | Breeding et al. |
| 5,718,430 A | 2/1998 | Aramapakul et al. |
| 5,732,950 A | 3/1998 | Moody et al. |
| 5,752,702 A | 5/1998 | McDoniel et al. |
| 5,762,340 A | 6/1998 | Feola et al. |
| 5,806,855 A | 9/1998 | Cherry et al. |
| 5,810,354 A | 9/1998 | Banyai et al. |
| 5,820,460 A | 10/1998 | Fulton et al. |
| 5,823,873 A | 10/1998 | Moody et al. |
| 5,830,069 A | 11/1998 | Soltesz et al. |
| 5,851,011 A | 12/1998 | Lott et al. |
| 5,865,437 A | 2/1999 | Moore et al. |
| 5,876,283 A | 3/1999 | Parra et al. |
| 5,897,436 A | 4/1999 | Singer et al. |
| 5,901,958 A | 5/1999 | Andrews et al. |
| 5,928,081 A | 7/1999 | Bochichio et al. |
| 5,944,315 A | 8/1999 | Mostashari et al. |
| 5,975,529 A | 11/1999 | De Keller et al. |
| 5,988,643 A | 11/1999 | Awada et al. |
| 5,999,808 A | 12/1999 | LaDue et al. |
| 6,012,719 A | 1/2000 | Webb et al. |
| 6,019,374 A | 2/2000 | Breeding et al. |
| 6,027,119 A | 2/2000 | De Lisle |
| 6,042,118 A | 3/2000 | Poitra et al. |
| 6,056,641 A | 5/2000 | Webb et al. |
| 6,098,984 A | 8/2000 | Moore et al. |
| 6,098,985 A | 8/2000 | Moody et al. |
| 6,102,402 A | 8/2000 | Scott et al. |
| 6,113,101 A | 9/2000 | Wirth et al. |
| 6,113,103 A | 9/2000 | Mostashari et al. |
| 6,149,154 A | 11/2000 | Grauzer et al. |
| 6,170,827 B1 | 1/2001 | Lombardo et al. |
| 6,196,918 B1 | 3/2001 | Miers et al. |
| 6,206,373 B1 | 3/2001 | Garrod |
| 6,206,374 B1 | 3/2001 | Jones |
| 6,206,780 B1 | 3/2001 | Awada |
| 6,229,534 B1 | 5/2001 | Gerra et al. |
| 6,237,916 B1 | 5/2001 | Webb |
| 6,270,079 B1 * | 8/2001 | Chamberlain ................ 273/292 |
| 6,273,424 B1 | 8/2001 | Breeding |
| 6,279,910 B1 | 8/2001 | de Keller |
| D452,283 S | 12/2001 | Regan, II et al. |
| 6,332,614 B1 | 12/2001 | Hesse |
| 6,334,614 B1 | 1/2002 | Breeding |
| 6,336,859 B2 | 1/2002 | Jones et al. |
| 6,345,823 B1 | 2/2002 | Webb |
| 6,375,189 B1 | 4/2002 | Jones |
| 6,406,024 B1 | 6/2002 | Perkins |
| 6,409,602 B1 | 6/2002 | Wiltshire et al. |

(56) References Cited

U.S. PATENT DOCUMENTS

| | | |
|---|---|---|
| 6,428,005 B2 | 8/2002 | Au-Yeung |
| 6,467,771 B1 * | 10/2002 | deKeller ............... 273/274 |
| 6,478,675 B1 | 11/2002 | Awada |
| 6,485,368 B2 | 11/2002 | Jones et al. |
| 6,517,072 B1 | 2/2003 | McInerney |
| 6,517,074 B1 | 2/2003 | Moody et al. |
| 6,561,897 B1 | 5/2003 | Bourbour et al. |
| 6,568,680 B1 | 5/2003 | Moody et al. |
| 6,581,936 B1 | 6/2003 | Zoccolillo et al. |
| 6,588,750 B1 | 7/2003 | Grauzer et al. |
| 6,607,443 B1 | 8/2003 | Miyamoto et al. |
| 6,637,747 B1 | 10/2003 | Garrod |
| 6,651,981 B2 | 11/2003 | Grauzer et al. |
| 6,651,982 B2 | 11/2003 | Grauzer et al. |
| 6,652,377 B1 | 11/2003 | Moody |
| 6,655,684 B2 | 12/2003 | Grauzer et al. |
| 6,698,759 B2 | 3/2004 | Webb et al. |
| 6,705,943 B2 | 3/2004 | Awada |
| 6,712,702 B2 | 3/2004 | Goldberg et al. |
| 6,719,291 B1 | 4/2004 | deKeller |
| 6,726,564 B2 | 4/2004 | Hogan et al. |
| 6,749,200 B2 | 6/2004 | Yurkins |
| 6,752,394 B2 | 6/2004 | Malcolm |
| 6,802,773 B2 | 10/2004 | Moody |
| 6,811,153 B1 | 11/2004 | Ko |
| 6,827,348 B1 | 12/2004 | Mitchell |
| 6,869,076 B1 | 3/2005 | Moore |
| 6,896,265 B1 | 5/2005 | Schlumbrecht |
| 6,923,446 B2 | 8/2005 | Snow |
| 6,929,264 B2 | 8/2005 | Huard et al. |
| 6,955,356 B2 | 10/2005 | Moody |
| 6,959,928 B2 | 11/2005 | Schultz |
| 6,964,418 B2 | 11/2005 | Moody |
| 6,986,514 B2 | 1/2006 | Snow |
| D518,112 S | 3/2006 | Abbott et al. |
| D519,164 S | 4/2006 | Austin |
| 7,029,011 B2 | 4/2006 | Strong et al. |
| 7,165,770 B2 * | 1/2007 | Snow ............... 273/292 |
| 7,175,522 B2 | 2/2007 | Hartl |
| 7,189,161 B1 | 3/2007 | Wiltshire et al. |
| 7,246,799 B2 | 7/2007 | Snow |
| D548,799 S | 8/2007 | Looney |
| 7,264,243 B2 | 9/2007 | Yoseloff et al. |
| 7,331,580 B2 | 2/2008 | Scibetta |
| 7,387,300 B2 | 6/2008 | Snow |
| 7,661,676 B2 | 2/2010 | Smith et al. |
| 8,272,958 B2 | 9/2012 | Smith et al. |
| 2001/0040345 A1 | 11/2001 | Au-Yeung |
| 2001/0048197 A1 | 12/2001 | Lo |
| 2002/0008356 A1 | 1/2002 | De Keller |
| 2002/0103018 A1 | 8/2002 | Rommerdahl et al. |
| 2002/0113371 A1 | 8/2002 | Snow |
| 2002/0175468 A1 | 11/2002 | Kenny et al. |
| 2002/0195775 A1 | 12/2002 | Webb et al. |
| 2003/0042679 A1 | 3/2003 | Snow |
| 2003/0050106 A1 | 3/2003 | Lyfoung |
| 2003/0199316 A1 | 10/2003 | Miyamoto et al. |
| 2004/0100025 A1 | 5/2004 | Conklin et al. |
| 2004/0102234 A1 | 5/2004 | Gold |
| 2004/0150163 A1 | 8/2004 | Kenny et al. |
| 2004/0160006 A1 | 8/2004 | Kenny et al. |
| 2004/0178582 A1 | 9/2004 | Garrod |
| 2004/0217548 A1 | 11/2004 | Snow |
| 2004/0224777 A1 | 11/2004 | Smith et al. |
| 2005/0029741 A1 | 2/2005 | Snow et al. |
| 2005/0032563 A1 | 2/2005 | Sines |
| 2005/0032564 A1 | 2/2005 | Sines |
| 2005/0051958 A1 | 3/2005 | Snow |
| 2005/0051962 A1 | 3/2005 | Chapman |
| 2005/0104292 A1 | 5/2005 | Schultz |
| 2005/0107148 A1 | 5/2005 | Webb |
| 2005/0127606 A1 * | 6/2005 | Snow et al. ............ 273/292 |
| 2005/0146093 A1 | 7/2005 | Grauzer et al. |
| 2005/0164759 A1 | 7/2005 | Smith et al. |
| 2005/0218596 A1 | 10/2005 | Adam et al. |
| 2005/0242506 A1 | 11/2005 | Yoseloff |
| 2005/0269782 A1 | 12/2005 | Sklansky |
| 2006/0084506 A1 | 4/2006 | Yoseloff et al. |
| 2006/0108740 A1 | 5/2006 | Kekempanos et al. |
| 2006/0119044 A1 | 6/2006 | Kekempanos et al. |
| 2006/0145417 A1 | 7/2006 | Grauzer et al. |
| 2006/0178183 A1 | 8/2006 | Van Asdale |
| 2006/0186599 A1 | 8/2006 | Kenny et al. |
| 2006/0267285 A1 | 11/2006 | Webb et al. |
| 2006/0270477 A1 | 11/2006 | Snow |
| 2006/0281513 A1 | 12/2006 | Kirkpatrick |
| 2006/0281534 A1 | 12/2006 | Grauzer et al. |
| 2006/0284376 A1 | 12/2006 | Snow |
| 2007/0024005 A1 | 2/2007 | Snow |
| 2007/0069462 A1 | 3/2007 | Downs et al. |
| 2007/0102882 A1 | 5/2007 | Snow |
| 2007/0210520 A1 | 9/2007 | Webb |
| 2009/0156310 A1 | 6/2009 | Fargo |
| 2010/0016050 A1 | 1/2010 | Snow et al. |
| 2012/0225706 A1 | 9/2012 | Yoseloff |

FOREIGN PATENT DOCUMENTS

| | | |
|---|---|---|
| DE | 3003376 | 8/1981 |
| EP | 338644 | 10/1993 |
| GB | 667345 | 2/1952 |
| GB | 2097570 | 4/1982 |
| GB | 2184029 | 6/1987 |
| GB | 94/14822 | 7/1994 |
| GB | 94/26324 | 12/1994 |

OTHER PUBLICATIONS

"Three-Card Poker," "Three-Card Monte," "Brag", Scarne's Encyclopedia of Games, John Scarne, Harper & Row Publishers, p. 28-31, 1973.

Bad Beat Texas Hold 'Em; Rack Card; Shuffle Master, Inc.; 2005.

Card Craps, Scarne's Encyclopedia of Card Games, pp. 321-323, (1948).

Casino Journal, vol. 8, No. 12, Dec. 1992, "Working within the systems: IGT's Linked Progressive Programs Take Leap to the Tables," pp. 10-15, 40, 41.

Copyright filing with the Bureau voor de Intellectuele Eigendom, Aruba, 13 pgs (Jan. 13, 1998).

Flop-A-Lock, 2006 (1 page).

Gibson, W.B. (1974) Hoyle's Modern Encyclopedia of Card Games, pp. 252, 257, 258.

Hoyle's Modern Encyclopedia of Card Games by Walter Gibson, p. 250, 3 pages, 1993.

Information Disclosure Statement Apr. 7, 1988 Describing "Sklansky's Casino Poker" and "Video Poker".

KISS Guide to Gambling by John Marchel, "No-Limit", DK Publishing, Inc., 2001, p. 344.

New Jersey Register (vol. 30, No. 14, Jul. 20, 1998). Rule Adoption, Other Agencies, Cazsino Control Commission, Accounting and Controls, Gaming Equipment, Rules of the Games, Fast Action Hold'Em {pp. 1-15) (Westlaw 30 N.J.R. 2639 (b)). 2005 Thomson/West.

Prime Table Games—Disclosure in Respect to Three Card Games, Derek J. Webb, Feb. 10, 2009.

Published Rule Sheet for Casino Poker from Vegas World, 1 page (1982).

Royer, Victory H., "How to Play Casino Poker—Texas Hold-em", received in the PTO Jul. 11, 1996, http://www.vegas.com/vegascom/bestbascholdem.

Scarne's Encyclopedia of Card Games, 299-304, 383 (1983).

Scarne's Encyclopedia of Games, Harper & Row, N.Y., Copyright 1973, p. 381, and title pages.

Scarne's Guide to Modern Poker, Constable and Company Limited, 1980, "Brag", pp. 159-160.

Scarne's New Complete Guide to Gambling, 440-45 {1974).

Show Five Cards, Scarne's Encyclopedia of Games, John Scarne, Harper & Row Publishers, pp. 28-29, 1973.

State of New Jersey Casino Control Commission Prn 217205 Civil Action IGT's Second Amended Petition for the Authorization for the Implementation of the Game of Progressive-21 Filed Sometime after Aug. 4, 1991.

(56) References Cited

OTHER PUBLICATIONS

Tre Card Stud TM Procedures Manual, Mikohn Gaming, Mar. 7, 2000.
U.S. Appl. No. 13/609,031, filed Sep. 10, 2012, titled "Network Gaming Architecture, Gaming Systems, and Related Methods," to Costello et al.
U.S. Appl. No. 13/353,194, filed Jan. 18, 2012, titled "Network Gaming Architecture, Gaming Systems, and Related Methods," to Costello et al.
U.S. Appl. No. 13/215,156, filed Aug. 22, 2011, and titled "Methods of Managing Play of Wagering Games and Systems for Managing Play of Wagering Games," to Roger M. Snow.
Webb, Derek J., "Three Card Poker Disclosure" (1992).
www.findarticles.com/p/articles/mi_mOEIN/is_2004_July_26/ai_n6122536/print; Mikohn Launches Texas Hold 'Em Bonus Poker Table Game.
www.galaxygaming.com/texasshootout.html; Texas Shootout; 2005 {5 pages}.
www.lakesentertainment.com/games.wpt; World Poker Tour; 2005 (6 pages).
www.oldvegaschips.com; Poker Rules & Poker Questions Answered; Texas Hold'em; Omaha High; Deuces Wild Poker; Caribbean Poker; Poker Rules, How to play poker, how to play Texas Hold'em Poker; 42 pages (accessed Mar. 10, 2006).
www.progressivegaming.net/pages/games/texasholdem.html; 2005 (2 pages).
www.riversideresort.com/gaming/live-games Deuces Wild Hold 'Em Fold 'Em, obtained Jan. 16, 2007 {4 pages}.

\* cited by examiner

METHODS OF PLAYING WAGERING GAMES AND RELATED APPARATUSES

CROSS-REFERENCE TO RELATED APPLICATIONS

This application is a continuation-in-part of U.S. patent application Ser. No. 13/399,141, filed Feb. 17, 2012, published as U.S. Patent Application Publication No. 2012/0225706 on Sep. 6, 2012, which is a continuation of U.S. patent application Ser. No. 11/108,159, filed Apr. 15, 2005, which is a continuation-in-part of U.S. patent application Ser. No. 10/938,483, titled "Six Card Poker Game," filed on Sep. 10, 2004, now U.S. Pat. No. 7,264,243, issued Sep. 4, 2007, the entire disclosure of each of which is incorporated herein by this reference.

FIELD

The present disclosure relates to wagering games, particularly wagering games using playing cards or images of playing cards, and wagering games played on casino tables, video machines, multi-player platforms or the internet.

BACKGROUND

Among the successful casino card games are LET IT RIDE® bonus poker, THREE CARD POKER® game and CARIBBEAN STUD® poker. These games have each achieved a high level of commercial success with different formats and attributes.

LET IT RIDE® stud poker is described in U.S. Pat. No. 5,288,081. The bonus version of the game is described in U.S. Pat. No. 6,273,424. In this game, the player makes a wager in three parts. Three cards are dealt to each player (there may be only a single player), and two common cards are dealt face down in front of the dealer. The player examines his/her three cards, evaluates the likelihood of a ranked hand (e.g., at least a pair of tens) being achieved with those three cards and the as yet unseen common cards. The player, based on judgment of that likelihood, may elect to withdraw the first of the three-part wager or keep the wager at risk. Upon the player making that decision, and withdrawing or allowing the first wager to remain at risk, a first of the common cards is turned face up. The player then can make another decision with regard to the play of the hand and whether there is a changed potential for a ranked hand. A second portion of the three-part wager is then withdrawn or allowed to remain at risk. After this decision, the last common card is exposed, and the rank of each player's hand, including the common cards, is evaluated. Payments are made to each player based on only the rank of hand achieved and the number of wagers left on the table from the original three-part wager. As noted, at least one wager must remain, as only two parts can have been withdrawn. Wagers are paid off at rates (or odds), for example, of 1:1 for pairs of at least tens, 2:1 for two pairs, 3:1 for three of a kind, 5:1 for straights, 7:1 for flushes, 12:1 for full houses, 50:1 for four of a kind, 250:1 for straight flushes, and 1000:1 for royal flushes. The specific payout odds can be varied and often casinos choose payout tables that help them achieve a desired theoretical hold percentage. Side bonus wagers may also be placed in which ranked hands over three of a kind receive fixed or progressive bonuses, such as $25,000 for a royal flush. The bonus payouts and hand combinations are typically displayed on a payout table on the table surface. The winning bonus combinations are typically a higher-ranking subset of the winning base game outcomes.

The THREE CARD POKER® game (e.g., as described in U.S. Pat. No. 5,685,774) deals three cards to each player and three cards to the dealer, all face down. In some commercial forms of the game, one dealer card is dealt face-up. Initially, one or two optional wagers may be made by the player. One such wager is for the "PAIR PLUS®" bonus bet, a bet on achieving a winning combination included in a payout table. Another wager is the game ante on which the player competes against the dealer. The Pair Plus bet in one example of the invention is a wager that the three-card hand will have a rank of at least one pair or more. The hand is paid off in multiples of the bet depending upon the rank of the hand, with up to 40:1 or more paid out for a straight flush. In the ante wager, if the player wants to compete against the dealer's hand (after viewing the rank of the player's hand), an additional wager equal to the ante must be placed by the player. The dealer's hand is then exposed. If the dealer does not have a hand of at least a certain qualifying rank (e.g., at least queen high), the dealer's hand is not in play. If the player has not made the additional wager, the ante is collected by the dealer. When the dealer hand does not qualify and the player has made the additional play wager, the ante is paid off to the player if the dealer's hand is not as high a rank as the player's hand and the play bet pushes. If the dealer's hand has qualified, and the dealer's hand is higher than the player's hand, then the ante and the additional wager are collected by the house. If the dealer's hand qualifies (e.g., at least queen high) and is lower than the player's hand rank, both the ante and additional wager are paid off, with multiples payable to the ante wager for certain high-ranking hands (e.g., straights, flushes, straight flushes, three of a kind, etc.). The ranking of the various poker hands is different in the three-card game than in five-card poker games.

In CARIBBEAN STUD® poker, described in U.S. Pat. No. 4,836,553, a player makes an initial ante wager, and five cards are dealt to each player and to a dealer. Players play against a dealer hand. The dealer exposes one of the five cards in the dealer hand to influence the player. The player decides if the dealt player hand is of sufficient rank to compete against the dealer's hand. The player may fold the player's hand at that time, or continue the game by placing an additional wager (referred to as the "bet") that is twice the value of the ante. The dealer's hand qualifies for active play against the bet only with a rank of ace-king or higher. If the dealer qualifies, the rank of the players' hands is compared with the rank of the dealer's hand. Players with hands of higher rank than the dealer's hand win both the ante and the bet. Players with hands of lower rank than the dealer's hand lose both the ante and the bet. If an initial side bet (often referred to as the jackpot side bet) has been made by the player, ranked hands of particularly high values (e.g., at least a flush) are paid absolute bonus amounts or may be paid out of a progressive jackpot. This bonus side bet is paid whether or not the player's hand rank exceeds the rank of the dealer's hand.

U.S. Pat. Nos. 5,100,137; 5,167,413; 5,242,163; 5,251,897; 5,322,295; 5,411,257; 5,437,451; and 5,820,460 to Fulton, and U.S. Pat. No. 5,636,842 to Cabot et al., describe games and apparatus in which a player may increase an initial wager after partial viewing of the players hand in a video gaming apparatus or casino table card game. Only "doubling the bet" (a wager equal to the initial ante) is literally disclosed. There are no options on the part of the player with respect to placing wagers of more than one times the initial wager in the game.

U.S. Pat. Nos. 5,489,101 and 5,531,448 to Moody describe poker games in which a player attempts to form a five-card poker hand that has the highest poker hand ranking. In the house banked version, all players play against the house and not against each other. The game is played with a standard fifty-two card deck. The game is played by a dealer and from one to seven players. Each player makes a bet and a portion of each bet may be allocated to a progressive jackpot. The dealer deals five cards to each player. The dealer then deals six cards as the community cards, which are arranged face down in three rows in a triangle pattern on the gaming table layout. The players may discard from none to five unwanted cards. The dealer turns up the community cards and pre-designated groups of cards from the community cards that are used for each player to make a complete five-card poker hand. The dealer determines the best hand each player has made according to poker hand rankings. All winning hands will be paid by the dealer according to the odds listed in the pay table. When a progressive jackpot payout is used, the dealer examines the six community cards to determine if one of the predetermined card arrangements has occurred. Any winning payouts from the progressive jackpot are distributed to the players at the table. The method may also be played as a player banked game or as a pot game. In one version of the present invention, the dealer deals three cards to each player. The dealer then deals eight cards as the community cards, which are arranged in groups or pairs of two cards each on the gaming table layout. In the preferred embodiment of the present invention, the card layout is in the format of a directional compass with a pair of cards each at the North position, East position, South position and West position, respectively.

U.S. Pat. No. 5,657,993 to Merlino et al. describes a method of playing a poker-type wagering game on top of a table layout having first and second player locations, a plurality of betting areas associated with each of the player locations and a community card area. The method includes a first player placing a wager on top of each of the betting areas associated with the first player location. A second player places a wager on top of each of the betting areas associated with the second player location. Each player receives two playing cards. A number of community cards are dealt face down in the community card area in a predetermined pattern. The number of community cards corresponds to the number of betting areas in one of the player locations. The faces of community cards are exposed in succession. Each time a community card is exposed, each of the players can either fold, wherein the folding player loses a number of wagers that corresponds to the number of community cards exposed or the players can leave all of the wagers on the corresponding betting areas until all of community cards are exposed. Once all of the community cards are exposed, each of the players combines his or her pair of cards with three of the community cards to form a completed stud poker hand. The player with the highest ranking hand wins all of the wagers.

U.S. Pat. No. 5,711,525 to Breeding describes a wagering card game in which the player makes an initial bet to participate in a base game. Prior to the play of the game, the dealer will display at least one additional card from the deck. After viewing this card or cards, the player is given an opportunity to place an additional wager that would qualify the player for an additional winning. By giving the player the opportunity to see at least one card in the deck, considerable insight is provided into the probabilities of certain hands being created. The Breeding patent recites a method of playing a wagering game using a deck of cards having a predetermined rank, comprising the steps of: (a) a player placing a first wager to participate in a base game; (b) a dealer dealing cards; (c) the dealer intentionally displaying at least one card from the deck and discarding that card; (d) the player placing a second optional wager after viewing the discarded card to simultaneously participate in a second wagering game; (e) completing play of the base game; and (f) resolving the player's first and second wagers, based upon the player's hand, resolution of the first wager being accomplished according to the standard rules of the base game while resolution of the second wager is accomplished according to a payout scheme.

U.S. Pat. No. 5,752,702 to McDoniel describes a method for playing a modified multiple betting round card game wherein a player has the opportunity to "cap" his/her bet, i.e., limit his or her risk by placing a ceiling on the amount the player wishes to bet. Once a player has initiated a hand, the player may check, call, bet, raise, or cap during subsequent betting intervals while maintaining his or her eligibility to win the bets placed and forfeited by other players during the betting intervals, which the player successfully completed. The bets placed by each player during each betting interval are kept separate and are organized according to betting columns printed on a game table. When the hand is finished, the dealer settles all bets made during each individual betting interval. Beginning with the last betting interval, the dealer awards all bets placed and forfeited to the player with the strongest hand who successfully completed the final betting interval. The dealer then settles the remaining intervals working from last to first. There is no description of the relative size of the wagers (to the ante) that may be placed. There are multiple betting intervals with the five community cards. Players play against each other, not against a pay table.

U.S. Pat. No. 5,901,958 to Andrews describes a method of playing at a gaming table a player-versus-pay table five-card stud poker game for up to seven players utilizing the 20 royal cards of a standard 52-card poker deck as a royal deck of cards with player awards based upon predetermined amounts related to a pay table of winning five-card hands. Bet wagers are initially accepted from each player at the gaming table, up to three cards are dealt face down to each of the occupied player positions at the table, and up to three cards from the royal deck of cards are dealt face down to a dealer position at the table. Each player, after viewing the dealt cards, is permitted to stand on the bet wager or double the bet wager, after which one of the face-down cards at the dealer position is up-turned for use as a community card by the players. Each player is then permitted to stand on the hand and bets or triples the bet wager after which the remaining face-down card or cards at the dealer position are up-turned for use as a community card by the players. Each player hand is up-turned and the hand, incorporating the community cards at the dealer position, is evaluated to determine whether or not such hand is a winning hand with respect to the pay table of winning hands, with each winning hand paid off in accordance with the pay table. The "double" and "triple" of the bet wager is a repeated one-to-one wager. The players also play against the dealer.

U.S. Pat. No. 5,928,081 to Bochichio et al. describes a card game that affords each player an opportunity to wager his hand as having a poker rank higher or lower than all other players. A dealer deals a first deal of one card face down to each player followed by a second deal of one card face up to each player. Thereafter, players either wager or fold. The dealer then proceeds to deal one card face down to all remaining players and places one card face up on the table as a community card available to all players. After a further round of wagering, the face-down cards of all players are exposed and a high-hand winner is selected as the player having the highest rank three-card hand among all players. Similarly, the low-hand winner is selected as the player having the best low rank three-card hand among all players. The total pot of wagers is divided between the best high-hand and low-hand winners.

U.S. Pat. No. 5,975,529 to de Keller describes a poker game played on a blackjack style table with a single dealer. The player opening the betting is rotated for each game. The game is played with chips/counters of various denominations. At the start of each game, all players place a bet of equal value in their respective pots. Players then place Bet 1 (the maximum and minimum value thereof being determined by the house) and each player is dealt two cards (this number may vary), face down, and the dealer receives three cards (this number may vary), one face up and two face down. The three dealer's cards are community cards, referred to as the "flop" and complete each player's hand. At this stage, the players know the identity of three cards and each player has the option of discarding their first or second card, or both, face down. Replacements, face down, are received for discards. Players may, at this stage, either "stand" by making no further bets or "raise" by wagering on Bet 2. The Bet 2 wager must be exactly equal in value to the amount wagered on Bet 1. When all wagers have been placed on Bet 2, a fourth card is revealed by the dealer. Players may again either stand at this stage or raise by wagering on Bet 3. Players are not permitted to make a third bet if they have not placed the second bet. The Bet 3 wager must be exactly equal in value to the amount wagered on Bet 1. When all third bets have been placed, the dealer turns up a fifth card. Each player reveals his or her cards and, provided they show a winning hand based on the list of poker hand rankings, are paid according to the total stake placed at the corresponding pay-offs/odds. The player with the highest poker hand is awarded all the pot bets. In the event of players holding identical hands, the pot is shared. No matter how many cards constitute community cards or how many cards are dealt to each player, the players select five cards to make up their hands. There is no variation in wagering allowed, and competition includes wagers against the pot and the dealer.

U.S. Pat. No. 6,042,118 to Poitra describes a method of playing a poker-type game wherein the game provides the players an opportunity to increase the amount wagered based upon two of the three community cards shown. After each player places a bet, two cards are dealt face down to each player and three cards are dealt face down to the dealer that are "community cards." The dealer then turns over two of the three community cards so that they are face up. Each player has the opportunity to "double-down." The dealer then turns over the remaining community card and then turns over each player's two cards. The bets are resolved by using the three community cards in combination with each player's two cards based upon a predetermined plurality of winning card combinations similar to poker. The card deck is a standard 52-card deck with one joker to make a 53-card deck. The joker is utilized only in certain combinations as a "wild card."

U.S. Pat. No. 6,651,981 to Grauzer et al. describes a casino wagering game comprising a poker card game played with conventional playing cards, comprising: (a) first, dealing two cards face down to each player, (b) second, conducting a round of betting after the two cards have been dealt, (c) third, dealing three community cards face up, wherein each community card is usable by any player to form a five-card poker hand, (d) fourth, conducting another round of betting after the third community card has been dealt; (e) fifth, dealing one community card face up, (f) sixth, conducting another round of betting after one community card has been dealt, (g) seventh, dealing one card face down to each player, (h) eighth, conducting a further round of betting, and (i) ninth, exposing the dealt cards to determine which player has the winning five-card poker hand, wherein each hand comprises three cards dealt to a player plus the four community cards; said steps (a) through (i) being conducted sequentially, beginning with steps (a) and concluding with step (i).

BRIEF SUMMARY

A card game is played against a pay table, wherein the dealer deals a partial hand to each player that is preferably completed by community cards (but may be completed by cards dealt directly to a hand or by a combination of cards dealt directly to a hand and at least one community card or wild card). After the ante wager is received by the house, the dealer will receive an election from each player to place a game or "play" wager before receiving another card for the player's hand (whether dealt directly to the player or as a community card revealed to all players) or an election to fold. At least some, or all, game wagers may be an amount within a range of multiples of the player (such as one times, two times, three times, four times, or five times the amount of the ante wager). The range of wagers may remain the same or vary with the number of dealt cards or community cards revealed to the players.

In some embodiments, methods of administering wagering games may comprise receiving an ante wager from each player. Cards comprising a partial hand may be dealt to each player. An election to fold or a play wager to continue participation in the wagering game of between one time and four times an amount of the ante wager may be received from each player. Additional cards may be dealt to complete the hand of each player; and the ante and play wagers may be resolved, a payout on each of the ante and play wagers may be paid to each player holding a complete hand of a predetermined rank or higher, and the ante and play wagers of each player holding a complete hand ranked lower than the predetermined rank may be collected by the house.

In other embodiments, methods of administering wagering games may comprise receiving an ante wager from each player and placing the ante wager in a first pot. Three player cards comprising a partial hand may be dealt to each player, which player cards are available to respective players individually. An election to fold or a play wager to continue participation in the wagering game of between one time and four times an amount of the ante wager may be received from each player, with any play wagers being added to the first pot. Two additional community cards available to all players may be dealt to complete a five-card poker hand of each player. The ante and play wagers may be resolved, a rake may be taken on the first pot, and at least a portion of a remainder of the first pot may be paid to each player holding a complete five-card poker hand ranked a pair of jacks or higher. In embodiments, play may also include a mandatory second pot wager that has no house advantage. The highest ranking hand wins the second pot at the conclusion of each round of play.

Automated table systems for administering wagering games may comprise at least one display screen, at least one player input, and at least one processor operatively connected to the at least one display screen and the at least one player input. The at least one processor may be configured to administer a wagering game using the at least one display screen and the at least one player input by being programmed to receive an ante wager from each player via the at least one player input; display three player cards comprising a partial hand to each player on the at least one display screen, which player cards are available to respective players individually; receive from each player an election to fold or a play wager to continue participation in the wagering game of between one time and four times an amount of the ante wager via the at least one player input; display two additional community cards available to all players on the at least one display screen to complete a five-card poker hand of each player; and resolve the ante and play wagers, authorize paying a payout on each of the ante and play wagers to each player holding a complete five-card poker hand ranked a pair of jacks or higher, and authorize collecting the ante and play wagers of each player holding a complete hand ranked lower than the predetermined rank.

Further embodiments may include one, some, or all of the following: The acts of the dealer may be carried out by a visual representation of a dealer, the visual representation being generated and/or displayed by a computer. The visual representation may be a virtual person (e.g., an animation), or may be a transmission (e.g., a video) of an actual person. The visual representation may be part of an online gaming experience of the disclosed game. The acts described in this disclosure associated with a dealer, including dealing cards, displaying or turning cards over, receiving or paying bets, or any other actions, may be represented in any way when used in an online environment. For example, the cards associated with a dealer action, described as being dealt or otherwise handled by a dealer, may appear as virtual cards or as transmitted pictures of physical cards. This may include a display of virtual card decks where each deck, individual card, and hand is displayed to an online player in a manner consistent with the game play disclosed herein, but may or may not include a visual representation of a dealer with the cards. Likewise, betting activity may be displayed in any manner to a player, including, but not limited to, virtual chips, betting pools, numbers, or other indicia of a bet amount.

The online experience may involve players playing remotely (e.g., in a different physical location) from the dealer, the location of a game server, or both, interacting through a networked connection that may include, but is not limited to, the Internet. The online game play may involve players who are also physically remote from each other. Remote connections may use networks involving several types of network links including, but not limited to, the Internet. Networked connections allowing physically remote players to play a game using a game server or system may be part of an implementation of a virtual or online gaming environment.

The actions described in this disclosure as the acts of a player, including betting, card selection (if any), card discards (if any), or any other actions, may be carried out over a network where the indicated actions are received as input to a device. The input-receiving device is typically physically remote from the game server or game host and connected over a long-distance network, but may also be implemented over a wired or wireless LAN in one building, or even in one room, for example. In one embodiment, game play generated at the server or host location may be displayed on the same device as the receiving device. In some embodiments, game play may be conveyed to remote players in devices separate from the devices receiving input from a player, such as public screens or publicly broadcast data about a game coupled with individual or private input devices. The reception of an input at a device may be accomplished through any technology adapted for such a purpose including, but not limited to, keypads, keyboards, touchpads, mice, optical location devices, eye movement/location detectors, sound input devices, etc. When discussing a device, it is understood the device may comprise multiple components and be complex, including hardware components combined with firmware and/or software, and may itself be a subcomponent of a larger system.

Yet other embodiments may comprise apparatuses and systems for administering wagering games according to embodiments of the disclosure.

BRIEF DESCRIPTION OF THE DRAWINGS

In the drawings, which illustrate what are currently considered to be the best modes for carrying out the invention.

DETAILED DESCRIPTION

The terms "gaming," "gambling," or the like, refer to activities, games, sessions, rounds, hands, rolls, operations, and other events related to wagering games such as web-based games, casino games, card games, dice games, and other games whose outcome is at least partially based on one or more random events ("chance" or "chances"), and on which wagers may be placed by a player. In addition, the words "wager," "bet," "bid," or the like, refer to any type of wagers, bets or gaming ventures that are placed on random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games that are "play for pay" as well as "play for fun," as will be described in more detail below.

There are at least some generic elements and combinations of elements of play within the scope of the game and technology disclosed. One example of a card game is played only against a pay table. In other forms of the invention, additional side bets against a dealer hand or against other players, or both are played simultaneously with the game against a pay table, as described below. The pay table may be against only a final hand (e.g., best five-card hand out of five, six or seven cards), or may be against intermediate hands as well as the final hand (as disclosed in U.S. Pat. Nos. 5,988,643; 6,206,780; 6,705,943; and U.S. patent application Ser. No. 09/815,181, filed Mar. 22, 2001, now U.S. Pat. No. 7,175,522, issued Feb. 13, 2007; U.S. patent application Ser. No. 10/602,015, filed Jun. 23, 2003, now U.S. Pat. No. 7,246,799, issued Jul. 24, 2007; and Ser. No. 10/646,670, filed Aug. 22, 2003, now U.S. Pat.

No. 6,986,514, issued Jan. 17, 2006), the disclosure of each of which is hereby incorporated in its entirety by reference.

Figure 1:
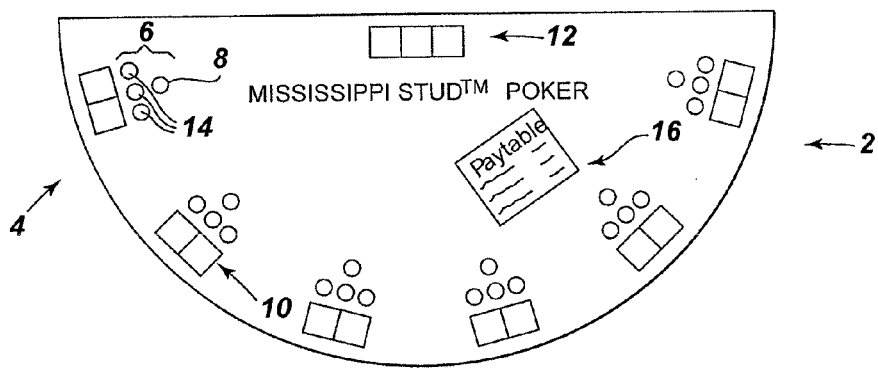
FIG. 1 shows a table layout for a game according to one embodiment of the present disclosure.

FIG. 1 shows a table layout 2 for a game according to one embodiment of the present disclosure. The table layout 2 is shown with an example of six player positions 4, with each player position 4 having a set of wager positions 6 comprising at least an ante wager position 8 and three play bet wager positions 14. Each player position 4 has at least a card receiving area 10 and the dealer position has a community card receiving area 12. Rules of the game and payout tables are shown as an optional area 16.

In the play of the present games, the players placing at least an ante wager (e.g., bonus, play against a dealer hand and/or jackpot wagers may be separately placed, but need not be compulsory) and receive a partial hand. By a "partial hand" is meant that in the play of the game, additional cards are available or necessary to complete a final hand in the game. The partial hand is preferably completed by community cards (but may be completed by additional cards dealt directly to a hand, by dealer cards, by randomly generated virtual cards, by additional bonus cards or by a combination of cards dealt directly to a hand and at least one community card or wild card). Community cards are cards dealt and displayed on the table that are used by all players in the construction of intermediate and final hands.

After placement of an ante wager and review of only their initial partial hands, each player will have an opportunity to place a first game or "play" wager before receiving another card for the player's hand (whether dealt directly to the player, assigned as a community card revealed to all players or assigned otherwise such as by random display of a virtual card). At least some or all game wagers (including the first game wager) may be an amount within a range of multiples that may be chosen from the range by the player (such as within a range of one times, two times, three times, four times, or five times or higher times or fractional times the amount of the ante wager). It is possible to allow the player to pass (also known as a "check"), making no wager and yet remain in the game, but this is less preferred. The range of wagers may remain the same or vary with the number of dealt cards or community cards revealed to the players. For example, the first play wager may be any of one times to five times, or only one times to two times, and a second play wager (later discussed) may be limited to the size of the first play wager actually made, or may again be one times to five times, only one times to two times, or only one times or two times according to the house rules.

One series of play elements in the game described herein may be practiced as follows. A method of playing a casino table card game against a pay table comprises a player placing a first ante wager to play the card game against the pay table. In one example of the game, five-card poker rankings are used as the basis of constructing the pay table. The player receives an initial partial player's hand of cards, which the player views. Ordinarily, the initial partial hand of cards comprises enough cards to give the player at least a feeling or some basis for evaluating the potential quality of the final player's hand. This will usually require the player to view at least two cards, although if no play wager is required before receiving at least a first additional card after receiving the initial partial player's hand, a single card may be initially dealt. The player reviews the initial partial player's hand and makes an election to fold, to stay with no additional wager, or to place an additional wager (either preferably a compulsory wager or less preferred an optional wager) before seeing any additional cards used to complete the initial partial player's hand. The player, after executing his decision, then views at least one first additional card from a set of additional cards to only partially complete the initial partial player's hand, forming a second partial player's hand.

The additional play wager, before seeing the first additional card, is selected by the player from a preferred range of amounts comprising one times, two times, and three times the ante wager. The method would then allow viewing the at least one first additional card as viewing a first additional, or preferably a first, community card. After placing the additional play wager and viewing the first community card, the player makes a second election to fold, to stay with no additional wager, or to place a second additional wager before seeing any second additional card used to complete or partially complete the second initial partial player's hand. The second additional wager is again preferably selected by the player from a range of amounts comprising one times, two times, and three times the ante wager, although as indicated above, different ranges or limits may be imposed based upon other events or other rules, but there should still be an optional range available to the player. Again, it is preferred that viewing at least one second additional card comprises viewing a second community card. After placing the second additional wager and viewing the second community card, the player makes a third election to fold, to stay with no additional wager, or to place a third additional wager before seeing any third additional card used to complete the initial partial player's hand. The third additional wager is again selected by the player from a range of amounts, for example, comprising one times, two times, and three times the ante wager.

The preferred game is played with two initial cards in the players' initial partial hands. There may then be three, four, or five community cards, with three community cards being preferred (as four and five cards would allow for a very high rank hand to be completed with one or two wagers still remaining, forming a five-card poker hand). The cards may be revealed one at a time or multiple cards at a time (especially with four or five community cards) to control the number of play wagers that may be available in the game. For example, with three community cards, there could be three play wagers when cards are revealed one card at a time, or two play wagers when a single card is revealed before one play wager (e.g., before the first or second play wager) and two cards are revealed before another play wager (e.g., before the second or first play wager, respectively). After the hand is complete (assuming that the player has placed all wagers necessary to remain in the game until conclusion of the disclosure of all community cards), all wagers are resolved against at least one pay table. There may be a single pay table (preferred) for all wagers, or different pay tables for each wager. The ante wager may be paid at 1:1 if the player remains in the game until the revelation of the community cards is complete, or if the player attains at least a minimum hand (which may be less than the minimum hand on a typical pay table, such as an A-K), or may be paid at the pay table rate as are the other wagers.

An example of a pay table with two initial cards and three community cards revealed one at a time could be as follows:

| PAY TABLE I | |
|---|---|
| FINAL HAND | PAYOUT ODDS |
| ROYAL FLUSH | 100:1 |
| STRAIGHT FLUSH | 50:1 |
| FOUR OF A KIND | 12:1 |
| FULL HOUSE | 7:1 |
| FLUSH | 5:1 |
| STRAIGHT | 4:1 |

-continued

| PAY TABLE I | |
|---|---|
| FINAL HAND | PAYOUT ODDS |
| THREE OF A KIND | 3:1 |
| TWO PAIR | 2:1 |
| PAIR OF SIXES OR BETTER | 1:1 |

Another example of a pay table for the ante wager and the play wagers, with two initial player cards and three community cards revealed, first one card and then both cards could be:

| PAY TABLE II | |
|---|---|
| FINAL HAND | PAYOUT ODDS |
| ROYAL FLUSH | 150:1 |
| STRAIGHT FLUSH | 70:1 |
| FOUR OF A KIND | 15:1 |
| FULL HOUSE | 8:1 |
| FLUSH | 5:1 |
| STRAIGHT | 4:1 |
| THREE OF A KIND | 3:1 |
| TWO PAIR | 2:1 |
| PAIR OF SIXES OR BETTER | 1:1 |

Yet another example of a pay table for the ante wager and the play wagers, with three initial player cards and two community cards revealed may include:

| PAY TABLE III | |
|---|---|
| FINAL HAND | PAYOUT ODDS |
| ROYAL FLUSH | 500:1 |
| STRAIGHT FLUSH | 100:1 |
| FOUR OF A KIND | 40:1 |
| FULL HOUSE | 8:1 |
| FLUSH | 6:1 |
| STRAIGHT | 4:1 |
| THREE OF A KIND | 3:1 |
| TWO PAIR | 2:1 |
| PAIR OF JACKS OR BETTER | 1:1 |
| PAIR OF SIXES TO PAIR OF TENS | PUSH |

In addition to these pay tables, as noted before, the payout for the ante wager may be different than for the remaining wagers. In addition, there may be an automatic ante bonus payout (one times or two times) for any initial pair in the first two cards.

The following example will show the physical steps of one example of play of a game of the present disclosure.

A game played according to the following teachings herein is referred to as MISSISSIPPI STUD™ poker, which is a casino table card game that can also be played on a video system, a home computer, on a multiplayer platform gaming system, as a hand-held practice game, or as a game offered on the Internet. The game is essentially a five-card stud poker game played against a pay table, with specific rules and game play elements. There is no player versus dealer competition.

Example 1

There are four players at a gaming table. Each player places an initial ante wager of $10, $10, $25, and $50, respectively, and the following initial two card hands are dealt to each player, with their initial decisions on play wagers shown beneath the hands. In Example 1, the players may make play bets up to three times the ante, according to house rules. The three (3) community cards may be dealt at this time, face down.

| Player 1 $10 | Player 2 $10 | Player 3 $25 | Player 4 $50 |
|---|---|---|---|
| 10♠ 10♥ | 6♣ 4♠ | J♦ Q♦ | A♥ 9♣ |
| $30 (3X) | Fold, no play wager | $50 (2X) | $50 (1X) |

Player 1 will make the maximum wager, as his hand is a guaranteed win on all wagers.

Player 2 will fold, as there is an extremely low likelihood of the hand being improved.

Player 3 has a good working hand, with two high cards, in suit, and a base for a straight. Player 3 places an intermediate "play" wager of two times the ante.

Player 4 has a decent working hand, with two cards above the minimum pairs needed for a win. Player 4, however chooses to make a play wager that is one times the ante.

After all of these wagers have been made (and without yet resolving the automatic win for player 1), the first community card is dealt, and it is a K♦. The hands of the players and their next wagers are shown in the following table:

| Player 1 $10 + $10 | Player 2 $10 | Player 3 $25 + $50 | Player 4 $25 + $25 |
|---|---|---|---|
| 10♠ 10♥ K♦ | | J♦ Q♦ K♦ | A♥ K♦ 9♣ |
| $30 (3X) | Folded | $75 (3X) | $25 (1X) |

Player 1 will make the maximum wager, as his hand is a guaranteed win on all wagers.

Player 2 has folded.

Player 3 has a good working hand, with three high cards, in suit, and a base for a straight, a flush, a straight flush or a royal flush, as well as a high pair. Player 3 chooses a play bet that is three times the ante.

Player 4 still has a decent working hand, with three cards above the minimum pairs needed for a win, but no winning hand yet. Player 4 makes a play wager of one times the ante.

After all of these wagers have been made (and without yet resolving the automatic win for player 1), the second community card is dealt, and it is a 10♦. The hands of the players and their next wagers are shown in the following table.

| Player 1 $70 | Player 2 $10 | Player 3 $150 | Player 4 $75 |
|---|---|---|---|
| 10♦ 10♠ 10♥ K♦ | | 10♦ J♦ Q♦ K♦ | A♥ K♦ 10♦ 9♣ |
| $30 (3X) | Folded | $75 (3X) | $50 (1X) |

Player 1 will make the maximum wager, as his hand is a guaranteed win on all wagers.

Player 2 has folded.

Player 3 has an excellent working hand, with four high cards, in suit, and a base for a straight, a flush, a straight flush or a royal flush, as well as a high pair. Player 3 wagers three times the ante, hoping for a very big payout.

Player 4 still has a decent working hand, with four cards above the minimum pairs needed for a win, but no winning hand yet. He bets one times the ante.

After all of these wagers have been made (and without yet resolving the automatic win for player 1), the third community card is dealt, and it is a Q♥. The hands of the players and their next awards are shown in the following table.

| Player 1 $100 Bet | Player 2 $10 | Player 3 $225 | Player 4 $125 |
|---|---|---|---|
| 10♦ 10♣ 10♥ K♦ Q♥ $300 (3X) Won | Folded | 10♦ J♦ Q♦ K♦ Q♥ A♥ K♦ 10♦ 9♣ Q♥ $225 (1X) Won | $0 All Bets Lost |

As can be seen, Player 1 has won three times each of his wagers (in an amount of $100) with three of a kind; Player 2 lost his initial ante wager of $10; Player 3 still won $225, even though the potential very high hand was not achieved; and Player 4 lost $125, as the hand did not end up with a pair of sixes or higher. The three times multiple was taken from Pay Table I above.

Example 2

An optional format is for there to be two community cards and either a wild card (the presence of which would necessitate a change in the pay table to lower payouts) or an individual additional card dealt to each hand. In this form of the game, the player can bet up to three times the ante.

The game will otherwise be played similarly, using much the same beginning cards as in Example 1. There are four players at a gaming table. Each player places an initial ante wager of $10, $10, $25, and $50, respectively, and the following initial two-card hands are dealt to each player, with their initial decisions on play wagers shown beneath the hands. The two (2) community cards may be dealt at this time, face down, and the final card for each is retained in the dealing shoe or shuffler, to be delivered after the two community cards are exposed.

| Player 1 $10 | Player 2 $10 | Player 3 $25 | Player 4 $50 |
|---|---|---|---|
| 10♠ 10♥ $30 (3X) | 6♣ 4♣ Fold, no play wager | J♦ Q♦ $50 (2X) | A♥ 9♣ $50 (1X) |

Player 1 will make the maximum wager, as his hand is a guaranteed win on all wagers.

Player 2 will fold, as there is an extremely low likelihood of the hand being improved.

Player 3 has a good working hand, with two high cards, in suit, and a base for a straight.

Player 4 has a decent working hand, with two cards above the minimum pairs needed for a win.

After all of these wagers have been made (and without yet resolving the automatic win for player 1), the first community card is dealt, and it is a K♦. The hands of the players and their next wagers are shown in the following table.

| Player 1 $10 + $10 | Player 2 $10 | Player 3 $25 + $50 | Player 4 $25 + $25 |
|---|---|---|---|
| 10♠ 10♥ K♦ $30 (3X) | Folded | J♦ Q♦ K♦ $75 (3X) | A♥ K♦ 9♣ $25 (1X) |

Player 1 will make the maximum wager, as his hand is a guaranteed win on all wagers.

Player 2 has folded.

Player 3 has a good working hand, with three high cards, in suit, and a base for a straight, a flush, a straight flush or a royal flush, as well as a high pair.

Player 4 still has a decent working hand, with three cards above the minimum pairs needed for a win, but no winning hand yet.

After all of these wagers have been made (and without yet resolving the automatic win for player 1), the second community card is dealt, and it is a 10♦. The hands of the players and their next wagers are shown in the following table.

| Player 1 $70 | Player 2 $10 | Player 3 $150 | Player 4 $75 |
|---|---|---|---|
| 10♦ 10♣ 10♥ K♦ $30 (3X) | Folded | 10♦ J♦ Q♦ K♦ $75 (7X) | A♥ K♦ 10♦ 9♣ $50 (1X) |

Player 1 will make a maximum wager equal to three times the ante, as his hand is a guaranteed win on all wagers.

Player 2 has folded.

Player 3 has an excellent working hand, with four high cards, in suit, and a base for a straight, a flush, a straight flush or a royal flush, as well as a high pair.

Player 4 still has a decent working hand, with four cards above the minimum pairs needed for a win, but no winning hand yet.

After all of these wagers have been made (and without yet resolving the automatic win for player 1), the third additional card is dealt to each player's hand, and the individual cards are shown below in the table. The hands of the players and their next awards are shown in the following table.

| Player 1 $100 Bet | Player 2 $10 | Player 3 $225 Bet | Player 4 $125 Bet |
|---|---|---|---|
| 10♦ 10♣ 10♥ K♦ 6♥ $300 (3X) Won | Folded | 10♦ J♦ Q♦ K♦ 9♦ $11,225 (50X) Won | A♥ K♦ 10♦ 9 Q♥ $0 All Bets Lost |

As can be seen, Player 1 has won three times each of his wagers with three of a kind; Player 2 lost his initial ante wager of $10; Player 3 has won $11,225, with a straight flush achieved; and Player 4 lost $125, as the hand did not end up with a pair of sixes or higher.

If a wild card were present in the deck, either as a potential community card or as an individual card, the pay tables would have to be significantly altered to accommodate the likelihood of more winning hands and higher winning hands. For example, in the above case, if the third community card had been a wild card, Player 1 would have had a four of a kind, Player 3 would have had a royal flush, and Player 4 would have had a pair of aces.

One specific mode of play of a game within the concepts described herein includes events where, after placing an ante wager, the players receive two cards face down (which they may view) and then three community cards are dealt face down. The players may view their hands to decide the likelihood of success of their hand against the pay table, and may fold or place a wager of from one to three times the amount of the ante wager. After all players at the table have acted on their individual decisions, a first and second of the three community cards is revealed. The players then analyze their hands in combination with the revealed first and second community cards, and may again fold or place a wager of from one to three times the amount of the ante wager. After all players at the table have acted on their individual decisions, a third of the three community cards is revealed. The players then analyze their hands in combination with the three revealed community cards, and may again fold or place a wager of from one times to three times the amount of the ante wager. After all players at the table have acted on their individual decisions, the third of the three community cards is revealed. This offers the opportunity on certain of the wagers to make wagers on hands that are known to be winning events. It also offers an opportunity for as much as an additional seven times the ante to be wagered during the course of the game (one times+three times+three times).

In some embodiments, the wagering games described herein may be played against the house (i.e., "house-banked"), which may involve playing against a dealer hand or a pay table, with payouts on wagers being paid by a casino or other gaming establishment and losses on wagers being collected by the casino or other gaming establishment. For example, methods of administering wagering games played against the house may comprise receiving an ante wager from each player. Cards comprising a partial hand, such as, for example, three player cards available to each respective player individually, may be dealt to each player. An election to fold or make a play wager to continue participation in the wagering game of between one time and multiple times, such as three or four times an amount of the ante wager may be received from each player. Additional cards, such as, for example, two community cards available to all participating players, may be dealt to complete the hand of each player; and the ante and play wagers may be resolved. A payout on each of the ante and play wagers may be paid to each player holding a complete hand of a predetermined rank or higher, which may be an odds payout determined by a pay table. The ante and play wagers of each player holding a complete hand ranked lower than the predetermined rank may be collected by the house.

Figure 2:
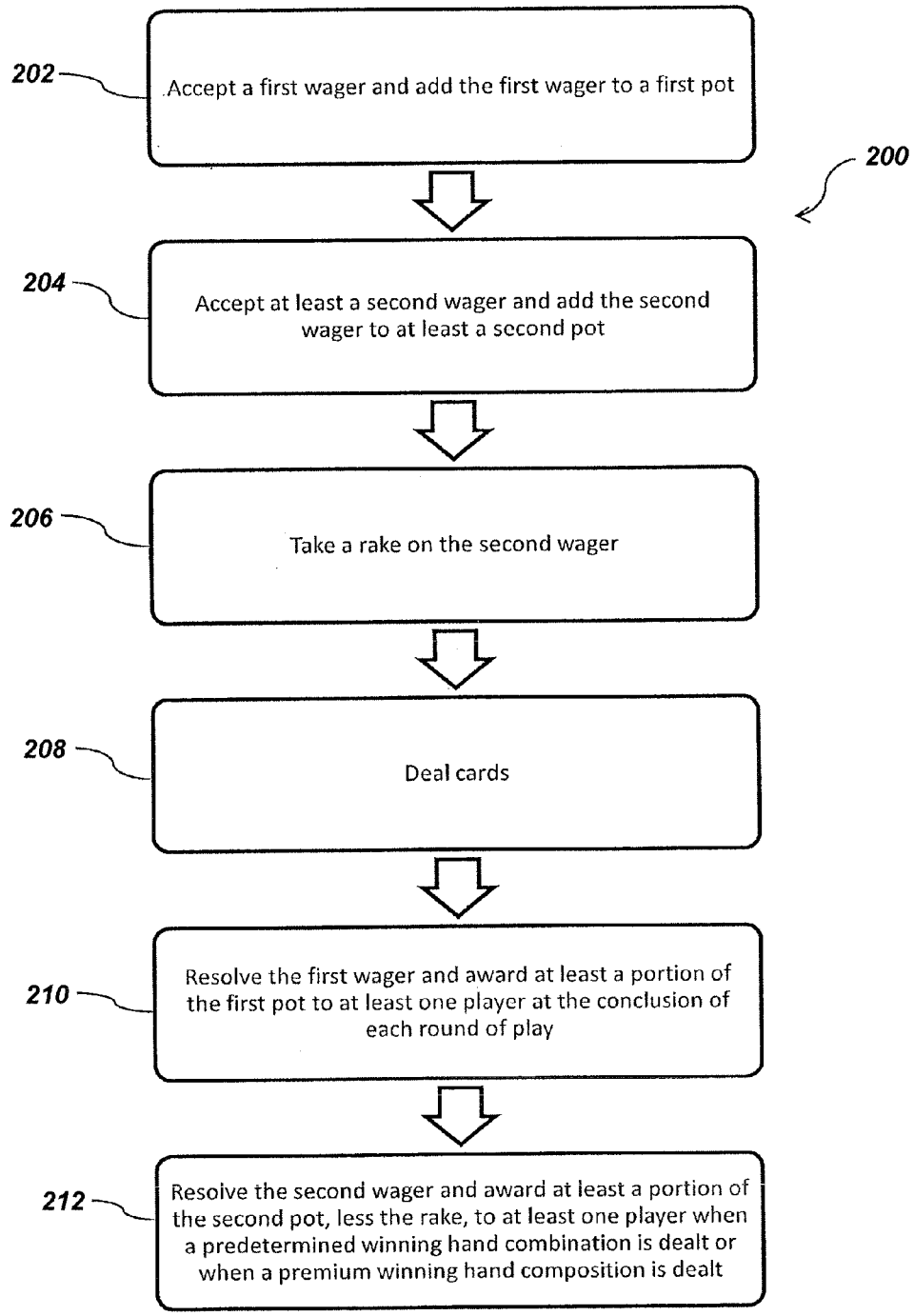
FIG. 2 is a flowchart diagram of a method of administering a wagering game, which may be at least partially player-banked.

In other embodiments, the wagering games, or at least one wager associated with the wagering game, may enable players to play against one another (i.e., be "player-banked" or "player-pooled"), with payouts on wagers being paid from a pot and losses on wagers being collected by other players. Referring to FIG. 2, a flowchart diagram of a method 200 of administering a wagering game, which may be at least partially player-banked, is shown. The method 200 includes accepting a first wager from a player and adding the first wager to a first pot (e.g., a pool or accumulation of bets), as indicated at 202. The first wager may comprise, for example, a base game wager. Such a base game wager may include, for example, antes, blinds, play bets, raises, and other bets made on the underlying wagering game. The base game wager may be accepted and the wagering game may be played only against other players in the wagering game, not against the house, in some embodiments. In some embodiments, a separate mandatory pot bet is collected from each player participating in the game. The second pot is a no house advantage bet that is awarded to the player holding the highest ranking hand in the round of play. Although the various pot bets for purposes of this disclosure are numbered, the numbering is for purposes of illustration only. For example, the second pot may include the game wagers and the first pot may be the no house advantage wagers. In other embodiments, the base game wager may be accepted and the wagering game may be played against the house. The wagering game may comprise, for example, poker or a variant of poker (e.g., five card-poker, three-card poker, MISSISSIPPI STUD™, TEXAS HOLD 'EM™, or CARIBBEAN STUD®), such as, for example, the game described previously in connection with FIG. 1, or the game described below. The wagers may be accepted by, for example, electronically accepting funds from a player account or other credit authorized via one or more communications media (e.g., via the Internet, wireless communications, land line) on a remote electronic device (e.g., a personal computer, a laptop, a tablet computer, or a smartphone) by player input, electronically accepting funds from a player account authorized on a local wagering game administration device in a casino by player input, or physically placing money or representations of money (e.g., chips) on a table at a live game in a casino. Suitable network architecture for electronically accepting funds from a player account authorized on a remote device may comprise, for example, the network gaming architecture disclosed in U.S. patent application Ser. No. 13/353,194, filed Jan. 18, 2012, now U.S. Pat. No. 9,120,007, issued Sep. 1, 2015, to Costello et al., and U.S. patent application Ser. No. 13/609,031, filed Sep. 10, 2012, now U.S. Pat. No. 8,974,305, issued Mar. 10, 2015, to Costello et al., the disclosures of which are incorporated herein in its entirety by this reference. Suitable local wagering game administration devices may comprise, for example, the chipless tables disclosed in U.S. Patent Application Pub. No. 2010/0016050, published Jan. 21, 2010, now U.S. Pat. No. 8,262,475, issued Sep. 11, 2012, to Snow et al., the disclosure of which is incorporated herein in its entirety by this reference.

At least a second wager may be accepted and added to at least a second pot, as indicated at 204. The second pot may be separate from the first pot. For example, the first and second pots may include chips located in separate areas on a gaming table when the wagering game is conducted live in a casino. As another example, the first and second pots may be displayed as separate amounts on a video display 374, 404, 416, 418, 430, 532, 560, 564, or 658 (see FIGS. 3, 4, 5, and 7) (e.g., a monitor) controlled by a processor 414, 428, or 642 (see FIGS. 4 and 7) and may be maintained in separate accounts when the wagering game is conducted online. The second wager may enable a player to be eligible to win an additional award, such as, for example, a progressive payout (e.g., a progressive jackpot), from the second pot. The second wager may be accepted and the wagering game may be played only against other players in the wagering game, not against the house, in some embodiments. In other embodiments, the second wager may be accepted and the wagering game may be played against a pay table. In other embodiments, the second wager is made against other player hands and has no house advantage. This bet may be resolved at the conclusion of a round of play by assigning the pot to the player holding the highest ranking poker hand. In some embodiments, the second wager may be a mandatory wager. In such embodiments, a player must place both the first wager and the second wager to play the wagering game. In other embodiments, the second wager may be optional, and a player wishing to play the wagering game may do so without placing the second wager and without being eligible to win any award from the second pot. In some embodiments, the second wager may include multiple sub-wagers. For example, the second wager may include a first pot wager, which may be added to a non-progressive pot, and a second pot wager, which may be added to a progressive pot. Such pots may be separate from one another and separate from the first pot. The second wager may be accepted by, for example, electronically accepting funds from a player account authorized on a remote electronic device by player input, electronically accepting funds from a player account authorized on a local wagering game administration device in a casino by player input, or physically placing money or representations of money on a table at a live game in a casino.

In some embodiments, the second pot may be a pooled or linked pot. For example, the second pot may include second wagers accepted from multiple concurrent wagering games, which may include only second wagers from those wagering games currently being played or may include accumulated second wagers from past wagering games. As specific, non-limiting examples, the second pot may include all second wagers accepted from a group of tables or local wagering game administration devices at a casino, from multiple groups of remote devices connected to network gaming architecture, or both. In other embodiments, the second pot may not be pooled, and awards for the second wager may be limited to the amounts wagered at a respective table, local wagering game administration device, or group of remote devices.

A rake (e.g., a commission for the house) may be taken on the first or second wager, as indicated at 206. For example, the house may collect a portion of the second wager at the time the second wager is placed or may collect a portion of amounts awarded from the second pot at the time the second pot or a portion of the second pot is awarded. The rake may comprise a fixed percentage of the second wager. For example, the percentage of the second wager collected for the rake may be greater than a theoretical house advantage for the underlying game. As another example, the rake may be less than an average house advantage for play of the wagering game by all players, including average and sub-average players, which may be calculated using a historical house advantage for the wagering game (e.g., a house advantage for the wagering game over the last 5, 10, or 15 years for a given casino). As specific, nonlimiting examples, the percentage of the second wager collected for the rake may be between 3% and 8%, between 4% and 7%, or between 5% and 6%. In other embodiments, the portion of the second wager collected for the rake may comprise a variable percentage of the second wager or may comprise a fixed quantity (e.g., a flat fee) irrespective of the total amount for the second wager, a fixed percentage with a cap, or a time-based fee for increments of time playing the wagering game.

All profits for the house may be made from the rake in some embodiments. In such embodiments, all second wagers in excess of the rake may be redistributed back to the players, rather than be collected by the house as additional revenue. Such limiting of profits for the house and redistribution of second wagers back to the players may increase the attractiveness of the wagering game to both inexperienced and highly skilled players. Because the amount earned by the house is known, highly skilled players may perceive that their skill will enable them to increase winnings, and inexperienced players may be enticed by the possibility of winning the second pot or a portion thereof. In other embodiments, the house may make profits on the rake and on losses from the second wagers, including losses resulting from optimal and suboptimal play. The rake may be maintained in a rake account, and profits for the house may be deducted from the rake account. The rake may be taken by, for example, electronically transferring funds from the second pot to a rake account (e.g., as instructed by a game server 606 (see FIG. 6) using casino account servers 610 (see FIG. 6)) or physically removing or exchanging money or representations of money from the second pot on a live table.

In one form of the invention, a first mandatory pot wager is received from each player to participate in the game. This pot does not accumulate between rounds. The pot bets may be raked, but in some embodiments, one or more pot bets are not raked. Players compete against each other to win this pot. The pot is awarded to a player according to a set of game rules, such as standard 5-card poker rankings. In the poker example, the highest ranking hand wins the pot. The pot bet has no house advantage.

At least one second mandatory wager is also made to participate in the game. The at least one second mandatory wager may include one or multiple wagers, including antes, play, blind, bonus bets or other bets. All second mandatory wagers are placed into a second pot that may increment between rounds. If the wager is made to achieve a predetermined hand with known payout odds, i.e., a pay table outcome, all payouts are made from the second pot.

The house rakes all second wagers that are paid into the second pot. The rake can be a fixed fee, a fixed percentage of an amount wagered or an amount that is related to amounts won, such as a percentage of amounts won. All raked funds go into a separate house rake account which represents funds earned by the house. A portion of the funds held in the rake account may be placed in a separate reserve account and may be used to re-seed the second pot when a jackpot is paid out, or to otherwise cover payouts that are not available in the second pot or rake account.

In some embodiments, all "odds" payouts are paid out of the rake and/or reserve account. In other embodiments, all payouts are made out of the second pot. The second pot can be a progressive fund and can accumulate until a premium hand payout is made.

In some forms of the invention, a third "progressive" wager may be received that is allocated to a third pot. The third pot is seeded with money from the reserve account and the balance in the pot grows to a very high amount. The third pot is won only when a premium hand is dealt, such as a Royal Flush in a 5-card Poker game.

The second wager may also be divided to fund a second and third pot. For example, the minimum second wager may be $2.00. Half (½) of the bet would go into the second pot and the other half (½) would fund the third progressive pot. Although the second pot in this example is also progressive, the second pot is designed to pay a player the entire balance more frequently that frequency of winning the third pot.

Cards may be dealt to all participating players, as indicated at 208. The number and kinds of cards dealt to players may depend on the wagering game being played. In embodiments where the wagering game is played at a live table or at a wagering game administration device in a casino, physical cards may be dealt to the players or electronic representations of cards may be displayed to the players on a video display or on video displays 374, 404, 416, 532, 564, or 658 (see FIGS. 3, 4, 5, and 7) of a respective wagering game administration device 300, 400, 500, 600 (see FIGS. 3 through 6). In embodiments where the game is played remotely on a remote electronic device 620, 640 (see FIGS. 6 and 7) (e.g., on a player's personal computer, laptop, tablet computer, or smartphone), electronic representations of cards may be transmitted to the players for display on their respective devices. In some embodiments, the cards may be dealt in successive rounds with intermittent opportunities to increase wager amounts (e.g., during rounds of betting) in accordance with a set of game rules of the underlying wagering game being played. For example, the players may have the opportunity to add to the amounts of their first wagers, which may increase the amount of the first pot to be won. As another example, the players may optionally add to the amounts of their second wagers, which may include multiple sub-wagers, to increase the amount of the second pot, which may include multiple sub-pots, although the amount of the second wager may be fixed in some embodiments without the ability to add thereto. In other embodiments, the cards may be dealt in a single round with only one, or with no, opportunity to increase wager amounts.

After dealing the cards is complete and at the conclusion of any rounds of betting, the first wager may be resolved and at least a portion of the first pot may be awarded to at least one player, as indicated at 210. Each successive round of making wagers, dealing cards, and resolving wagers may constitute a round of play, and the first pot or a portion of the first pot may be awarded to at least one player at the end of each round of play. The player to whom the first pot or the portion of the first pot is awarded may hold a winning hand or at least a tying hand for that round of play according to the rules of the wagering game being played. Awarding the first pot or the portion of the first pot may comprise crediting a player account of each wining player or may comprise distributing physical money or physical representations of money to each winning player.

In some embodiments, an entire amount of the first pot may be awarded to at least one player at the end of each round of play. In such embodiments, the first pot may be a non-progressive pot. The award of the entire first pot to at least one player at the end of each round of play may enable the wagering game to qualify as a legal form of online gambling under some relevant statutes. For example, in games that require a mandatory pot bet that has no rake and no house advantage, and all other bets go into a second progressive pot that is raked, the game may qualify as "poker" to gaming authorities, especially for online versions of the games. Awarding the entire amount of a pot to at least one player at the end of each round of play redistributes lost first wagers attributable to suboptimal play to other players, rather than to the house. Accordingly, such a wagering game may be particularly attractive to players who perceive themselves as being highly skilled in the wagering game and, therefore, more able to take advantage of suboptimal play by other players. In some embodiments, a portion of the first pot may be awarded to at least one player at the end of each round of play. For example, the house may take a rake on all of the wagers, which may still enable the wagering game to be qualify as a legal form of online gambling under some relevant statutes. The rake taken on a wager may comprise, for example, between 1% and 8%, between 2% and 6%, or between 3% and 5% of the first wager. The rake amounts on each wager may be more or less than the rake taken on other wagers in some embodiments. In some embodiments, a rake may be taken from winnings from a pot. In still other embodiments, a portion of a pot wager may remain in the pot or be redistributed to another pot to be awarded in a subsequent round of play as a progressive pot. In such an example, the portion of the wager remaining in the pot or redistributed to another pot may comprise, for example, a fixed percentage of the first wager, a variable percentage of the first wager (e.g., an odds payout may be awarded and the remainder retained in the first pot or redistributed to the other pot), or a fixed amount.

In lieu of or in addition to a rake taken on one or more wagers or from winnings, the house may be compensated in a number of other ways, including without limitation a flat fee per round of play, a percentage of wagers made with or without a cap, rental of a player "seat," or otherwise as is known in the gaming art. All such compensation may be generally referred to as a commission.

Wagers may be resolved by awarding at least a portion of a pot, less the rake or commission, as indicated at 212. Prizes may be awarded to at least one player when a predetermined winning hand combination is dealt or when a premium winning hand composition is dealt. The pot may not be awarded at the end of each round of play, but may grow during each successive round in which no player is dealt a predetermined winning hand combination or a premium winning hand composition. In other words, the pot may be a progressive pot, the award of which may depend on the cards held by the players. Awarding a pot or a portion of the pot may comprise crediting a player account with funds from the pot or may comprise distributing physical monies or physical representations of monies from the pot to the player. In some embodiments that include a first pot that is a no house advantage pot resolved at the end of a round and a second pot that receives all other game bets, all players participating in the wagering game who have made the second pot wager may be eligible to win the second pot or a portion of the second pot. Players who are ineligible to win the first pot, and players who have folded but still have one or more other active bets in play, are eligible.

A predetermined winning hand combination may comprise, for example, four of a kind, a full house, a flush, a straight, three of a kind, two pair, or one pair. For example, a portion of the second pot may be awarded to a player holding a full house when a full house has been predetermined to be a winning hand combination. A portion of a pot may be a fixed amount, a fixed odds payout or a percentage of the pot. A hand qualifying as a new winning hand combination or a set of hands qualifying as a set of new winning hand combinations may be predetermined at the beginning of each round of play in some embodiments. In other embodiments, a new winning hand combination or a set of new winning hand combinations may be predetermined at the beginning of play and may remain fixed until at least one player achieves the predetermined winning hand combination or one of the set of predetermined winning hand combinations, at which time a new winning hand combination or a set of new winning hand combinations may be predetermined. In still other embodiments, the hand combinations qualifying as winning hand combinations may be predetermined at the outset of the wagering game and remain fixed for the duration of the wagering game. The hands qualifying as winning hand combinations may be predetermined at random from a list of possible winning hand combinations, or may be predetermined following a schedule of possible winning hand combinations. For example, a game server 606 (see FIG. 6) or a live dealer administering the wagering game may randomly predetermine from among, or may sequentially cycle through a table including, a group of possible winning hand combinations consisting of four of a kind, a full house, a flush, a straight, three of a kind, or two pair to predetermine the winning hand combination for a round or for multiple rounds of play. In other embodiments, the winning hand combination may be randomly determined. For example, a 3-7-8-10-Jack of a mixture of diamond and/or heart suits may be the randomly selected winning hand.

In embodiments where a portion of the second pot is awarded to at least one player holding a predetermined winning hand combination, the portion may comprise a percentage of the second pot corresponding to the odds of receiving that predetermined winning hand combination (e.g., an odds payout), may comprise a fixed percentage of the second pot, or may comprise a fixed quantity (e.g., a fixed payout), which may also correspond to the odds of receiving that predetermined winning hand combination (e.g., a fixed odds payout). For example, the portion of the second pot awarded to at least one player holding a predetermined winning hand combination may be a first fixed amount for a full house, a second, lower fixed amount for a flush, or a third, lowest fixed amount for a straight, where the set of predetermined winning hand combinations includes a full house, as straight, and a flush. As a specific, non-limiting example, a player holding a predetermined winning hand combination may be awarded 20% of the second pot. The second pot may be decremented by the amount awarded to each player holding a predetermined winning hand combination in embodiments where a payout (e.g., a fixed odds payout) is taken from the second pot, not a rake account.

In some embodiments, the second pot or a portion of the second pot may be awarded to each player holding a predetermined winning hand combination. In such embodiments, each player holding a predetermined winning hand combination may be awarded an equal portion of the second pot or may be awarded different portions of the second pot (e.g., different quantities based on the odds of holding different predetermined winning hand combinations or different quantities for holding differently ranked predetermined winning hand combinations). In other embodiments, the second pot or a portion of the second pot may be awarded to only one player who holds the highest ranked predetermined winning hand combination, while other players holding predetermined winning hand combinations may not be awarded any portion of the pot. In still other embodiments, the second pot or the portion of the second pot may be awarded to only one player who holds the highest ranked predetermined winning hand combination and who holds the winning hand for the underlying game.

A premium winning hand composition may comprise, for example, four of a kind, a straight flush, or a royal flush. The hand compositions that will qualify as premium winning hand compositions may be predetermined at the beginning of play. For example, at the outset of the wagering game, it may be predetermined that only straight flushes and royal flushes will qualify as premium winning hand compositions. The hand compositions qualifying as premium winning hand compositions may remain fixed throughout the duration of the wagering game or may change during the wagering game. For example, after a player has achieved a premium winning hand composition, the hand compositions qualifying as premium winning hand compositions may be made more restrictive or less restrictive. As a specific, non-limiting example, after a player has achieved a straight flush, the hand compositions qualifying as premium winning hand compositions may be restricted to royal flushes or may be expanded to include four of a kind. The hands that will qualify as premium winning hand compositions may be predetermined at random from a list of possible premium winning hand compositions, or may be predetermined following a schedule of possible premium winning hand compositions. For example, a game server 606 (see FIG. 6) or a live dealer administering the wagering game may randomly predetermine from among, or may sequentially expand and contract a table including, a group of possible premium winning hand compositions consisting of four of a kind, a straight flush, or a royal flush which will be the predetermined premium winning hand composition for a round or for multiple rounds of play.

The amount awarded from the second pot for achieving a premium winning hand composition may be a progressive payout at least as great as a maximum award possible for achieving a predetermined winning hand composition. For example, the entire second pot may be awarded when a player or multiple players are dealt a premium winning hand composition, and only a portion of the second pot may be awarded when a player or multiple players are dealt a predetermined winning hand combination. In embodiments where a portion of the second pot is awarded for premium winning hand compositions, the portion awarded may comprise a percentage of the second pot corresponding to the odds of receiving that premium winning hand composition (e.g., an odds payout), may comprise a fixed percentage of the second pot, or may comprise a fixed quantity (e.g., a fixed payout), which may also correspond to the odds of receiving that premium winning hand composition (e.g., a fixed odds payout). In other embodiments, the entire amount of the second pot may be awarded for premium winning hand compositions.

In some embodiments, the second pot, a portion of the second pot, or a third pot may be awarded to each player holding a premium winning hand composition. In such embodiments, each player holding a premium winning hand composition may be awarded an equal portion of the second pot or may be awarded different portions of the second pot (e.g., different quantities based on the odds of holding different premium winning hand compositions or different quantities for holding differently ranked premium winning hand compositions). In other embodiments, the second pot, a portion of the second pot, or a third pot may be awarded to only one player who holds the highest ranked premium winning hand composition, while other players holding premium winning hand compositions may not be awarded any portion of the pot. In still other embodiments, the second pot, a portion of the second pot, or a third pot may be awarded to only one player who holds the highest ranked premium winning hand composition and who holds the winning hand for the underlying game.

When one player holds a predetermined winning hand combination and another player holds a premium winning hand composition at the conclusion of a single round of play, the second pot may be awarded in its entirety to the player holding the premium winning hand composition in some embodiments. In other embodiments, each player may be awarded a portion of the second pot, the amounts of which may include, for example, percentages of the second pot corresponding to the relative odds of receiving that premium winning hand composition and that predetermined winning hand combination. In still other embodiments, the player holding the premium winning hand composition may be awarded the entire amount of the second pot and the player holding the predetermined winning hand combination may be awarded a fixed odds payout deducted from the rake account.

In some embodiments, the second pot may be seeded with money from the rake account or reserve account at the beginning of play, after the second pot or a portion of the second pot has been awarded, or both. For example, the second pot may be seeded from the rake account of the house, and the house may maintain an amount of funds in the rake account sufficient to significantly reduce (e.g., to essentially eliminate) the likelihood that any payouts made from the rake account and any seeding amounts withdrawn from the rake account exhaust or overdraw the rake account. In some embodiments, a casino reserve account may be provided to fill the rake account in the event of an overdraw. Such seeding may incentivize players to participate in the wagering game, and specifically to place the second wager to be eligible for the second pot. In addition, such seeding may reduce the likelihood that the amount of funds in the second pot may be insufficient to cover all the payouts to players. For example, where a player achieves a premium winning hand composition in one round of play, a player achieves a predetermined winning hand combination in the immediately following round of play, and a fixed odds payout is to be awarded to the player holding the predetermined winning hand combination, the amount seeded to the second pot between those rounds of play may be at least as great as the maximum fixed odds payout awardable for any predetermined winning hand combination. The second pot may be seeded each time the second pot is awarded in its entirety or each time the amount in the second pot is lower than the maximum fixed odds payout.

As a specific, non-limiting example, the wagering game may comprise a player-pooled variant of poker. Each player at the table is required to make a first pot bet. The pot bets are pooled and are not raked. The first pot bet has no house advantage. The player holding the highest ranking poker hand at the conclusion of the round wins the first pot. An ante wager may be received from each player and placed into a second pot. In some embodiments, a bonus wager may be received from at least one player and placed into the second, progressively pooled pot. Three cards, which may be player cards available respectively to each individual player, forming a partial hand may be dealt to each player. An election to fold or a play wager to continue participation in the wagering game with a value of between one time and three or four times a value of the ante wager may be accepted from each player, with any play wagers being added to the second pot. Two additional community cards available to all players may be dealt to complete a five-card poker hand for each player. The house may not take a rake on the first pot in some embodiments. In other embodiments, the house may take a rake on the first and second pot. For example, the house may only take a rake on the ante wager, and play wagers added to the second pot may not be subject to the rake. The ante and play wagers may be resolved and at least a portion of the second pot (e.g., the entire amount of the second pot), minus any rake, may be paid to a winning player or winning players. In some embodiments, players may win the first and second pots by holding the highest-ranked five-card poker hand, when compared to the ranks of hands held by other players participating in the wagering game. In other embodiments, players may win the second pot by holding a five-card poker hand of a predetermined rank or higher, which may enable multiple players to win portions of the second pot. In such embodiments, players having differently ranked hands that are both of the predetermined rank or higher may receive portions of the pot that are scaled in proportion to the relative difficulty of achieving the specific ranks of hands held by the winning players. In embodiments where players win by holding a five-card poker hand of a predetermined rank or higher, the second pot may increase progressively between rounds if no player is dealt a five-card poker hand of the predetermined rank or higher. When multiple tables are linked and/or multiple properties have linked tables, the progressive meter grows faster and attracts more players. In other embodiments, an entire amount of the first pot, or second pot, or both may be distributed among the players after each round of play. In embodiments where at least one player made the bonus wager, a progressive payout may be paid on the bonus wager to at least one player holding a predetermined winning hand combination or a premium winning hand composition. In some embodiments, the progressive payout may be paid on the bonus wager regardless of whether the player holding the predetermined winning hand combination or premium winning hand composition also held the highest-ranked poker hand for purposes of the first pot bet wagers.

In some embodiments, wagering games may be played without risking money in connection with the wagers (i.e., "play-for-fun" games). Access to play-for-fun wagering games may be granted on a time period basis in some embodiments. For example, upon initially joining the wagering game, each player may automatically be given wagering elements, such as, for example, chips, points, or simulated currency, that is of no redeemable value. After joining, the player may be free to place bets using the wagering elements and a timer may track how long the player has been participating in the wagering game. If the player exhausts his or her supply of the wagering elements before a predetermined period of time has expired, the player may simply wait until the period of time passes to rejoin the game and receive another quantity of the wagering elements to resume participation in the wagering game.

Example

The dealer or a processor-based gaming system accepts an ante wager from each player. Three players participate in the game. Three cards are dealt to each player or player position according to the following table:

| Ante Wager | Player 1 $5 | Player 2 $10 | Player 3 $20.00 |
|---|---|---|---|
| Player Cards | A♥ A♣ A♦ | 2♦ 9♥ 9♦ | 4♦ A♦ 6♦ |
| Play Wager | 4 × Ante | 4 × Ante | 2 × Ante |
| Player cards and common cards | A♥ A♣ A♦ 2♥ 3♥ (3 Aces) | 2♦ 9♥ 9♦ 2♥ 3♥ (2 Pairs) | 4♦ A♦ 6♦ 2♥ 3♥ (Pr. of 2's) |
| Player wins | 3 × 5 × $5 = $75 | 2 × 5 × $10 = $100 | 0 |

Ante Wagers are placed according to the pay table below. Each player elects to play and not fold. Play wagers that are multiples of 1-4× the ante are made after viewing the player's 3 cards. The two dealer cards are revealed and the best 5-card poker hands are determined for each player.

Players are paid on the Ante and Play Wagers according to the following pay tables:

| HAND | ODDS |
|---|---|
| Royal Flush | 500 to 1 |
| Straight Flush | 100 to 1 |
| 4 of a Kind | 40 to 1 |
| Full House | 8 to 1 |
| Flush | 6 to 1 |
| Straight | 4 to 1 |
| Three of a Kind | 3 to 1 |
| Two Pair | 2 to 1 |
| Pair of Jacks or Better | 1 to 1 |
| Pair of 6s to 10s | Push |

Players can optionally place a three-card-poker side bet wager that pays according to a pay table such as the following; using three-card poker rankings as the basis for determining winning hands:

| HAND | ODDS |
|---|---|
| Straight Flush | 40 to 1 |
| Three of a Kind | 30 to 1 |
| Straight | 6 to 1 |
| Flush | 3 to 1 |
| Pair | 1 to 1 |

The game may be implemented as a computerized game, the game processor delivering game pieces and game outcomes to a display with a user interface. In some forms of the invention, the game is implemented as an on-line gambling game that is either house banked, or is player banked. Player-banked versions of the game could include adding a mandatory pot wager to the game that is not raked. The highest ranking 5-card poker hand wins the first pot at the conclusion of a round of play. The Ante and Play Wagers are placed in a second pot that pays odds payouts and provides a winning prize of 100% of the second pot when a premium hand such as a Royal Flush is dealt to a player. The second pot is raked. House banked versions of the game, as well as play-for-fun versions of the game operate in the same manner as live versions of the game, except the processor performs the functions of the dealer, such as accepting wagers or wager elements of no value, displaying cards on a display screen rather than flipping over physical cards on a table, etc.

Players

In some embodiments, a hierarchy of players may determine the quantity of wagering means given to a player for each predetermined period of time. For example, players who have been participating in the wagering game for a longer time, who have played closest to optimal strategy for the game, who have won the largest percentage of wagers, or who have won the largest quantities of wagering elements from their wagers may be given more wagering elements for each allotment of time than players who have newly joined, who have played according to poor strategy, who have lost more frequently, or who have lost larger quantities of wagering elements. In some embodiments, the hierarchy of players may determine the duration of each allotment of time. For example, players who have been participating in the wagering game for a longer time, who have played closest to optimal strategy for the game, who have won the largest percentage of wagers, or who have won the largest quantities of wagering elements from their wagers may be given shorter allotments of times to wait after exhausting their supply of wagering elements than players who have newly joined, who have played according to poor strategy, who have lost more frequently, or who have lost larger quantities of wagering elements. In some embodiments, players who have not run out of wagering elements after the period of time has expired may have the balance of their wagering elements reset for a subsequent allotment of time. In other embodiments, players who have not run out of wagering elements may retain their remaining wagering elements for subsequent allotments of time, and may receive additional wagering elements corresponding to the new allotment of time to further increase the balance of wagering means at their disposal. Players may be assigned to different categories of players, which determine the number of wagering elements awarded. In a given period of time, higher level players, or players who have invested more time playing the game may earn more wagering elements per unit of time than a player assigned to a lower level group.

In some embodiments, a player may be permitted to redeem an access token of no redeemable face value, such as, for example, points associated with a player account (e.g., social media account credits, online points associated with a transacting account, etc.), to compress the period of time and receive more wagering elements. The access tokens may be purchased or may be obtained without directly exchanging money for the access tokens. For example, access tokens may be acquired by participating in member events (e.g., completing surveys, receiving training on how to play the wagering game, sharing information about the wagering game with others), spending time participating in the wagering game or in a player account forum (e.g., logged in to a social media account), or viewing advertising. Thus, an entity administering play-for-fun wagering games may not receive money from losing player wagers or may not take a rake on wagers, but may receive compensation through advertising revenue or through the purchase of access tokens redeemable for time compressions to continue play of the wagering game or simply to increase the quantity of wagering elements available to a player.

After a player has stopped participating in a play-for-fun wagering game, any remaining quantities of the wagering means may be relinquished by the player in some embodiments. For example, logging out of a play-for-fun wagering game administered over the Internet may cause any remaining wagering elements associated with a respective player to be lost. Thus, when the player rejoins the play-for-fun wagering game, the quantity of wagering elements given to the player for an allotment of time may not bear any relationship to the quantity of wagering elements held by the player when he or she quit playing a previous session of the wagering game. In other embodiments, the quantity of wagering elements held by a player when stopping participation may be retained and made available to the player, along with any additional quantities of wagering elements granted for new allotments of time, when rejoining the wagering game.

As a specific, non-limiting example of a method of administering a play-for-fun wagering game, an ante wager of no redeemable value, such as, for example, using chips that are not redeemable for anything of value, may be received from each player. Cards comprising a partial hand, which may comprise three player cards available to each respective player individually, may be dealt to each player. An election to fold or a play wager of no redeemable value to continue participation in the wagering game of between one time and four times an amount of the ante wager may be received from each player. Additional cards, such as, for example, two community cards available to all players, may be revealed to complete the hand of each player; and the ante and play wagers may be resolved. A winning amount of no redeemable value on each of the ante and play wagers may be given to each player holding a complete hand of a predetermined rank or higher, and the ante and play wagers of each player holding a complete hand ranked lower than the predetermined rank may be removed from play. In one embodiment, all payouts are an odds multiple of the amounts wagered.

Various platforms are contemplated that are suitable for implementation of embodiments of wagering games according to the present disclosure. For example, embodiments of wagering games may be implemented such that one or more players may place wagers and engage in game play according to the rules of the wagering games. For example, wagering games may be implemented on gaming tables, which may include physical gaming features, such as physical cards, physical chips, and may include a live dealer and a shuffler or shoe. More specifically, a live dealer may deal physical cards, accept wagers, issue payouts, and perform other administrative functions of game play. Some embodiments may be implemented on electronic devices enabling electronic gaming features, such as providing electronic displays for display of virtual cards, virtual chips, game instructions, pay tables, etc. Some embodiments may include features that are a combination of physical and electronic features.

As an example, embodiments of wagering games may be implemented on an individual gaming device for accepting wagers that has a display screen and inputs for enabling game play of the wagering games. Such an individual gaming device may be linked with other gaming devices that may be operated, for example, by other players. Some individual electronic gaming devices may be referred to as an individual player "cabinet" and may be stationary, such as being located on a casino floor. Other individual electronic gaming devices may be portable devices that may be carried to different locations by the player. Portable devices may include both display of the ongoing game play and input reception for game play by a player, and may be configured for receiving input from a player while the game play is displayed on a public monitor, or other display device. Game play and game outcomes may also be displayed on a portable device.

As previously noted, the present games and rules may be played as a live casino table card game, as a hybrid casino table card game (with virtual cards or virtual chips), on a multi-player electronic platform (as disclosed in U.S. patent application Ser. Nos. 10/764,827; 10/764,994 (now U.S. Pat. No. 7,661,676, issued Feb. 16, 2010); and Ser. No. 10/764,995 (now U.S. Pat. No. 8,272,958, issued Sep. 25, 2012), all filed on Jan. 26, 2004, the disclosure of each of which applications is incorporated herein in its entirety by this reference), on a personal computer for practice, on a hand-held game for practice or on a legally authorized site on the Internet.

Figure 3:
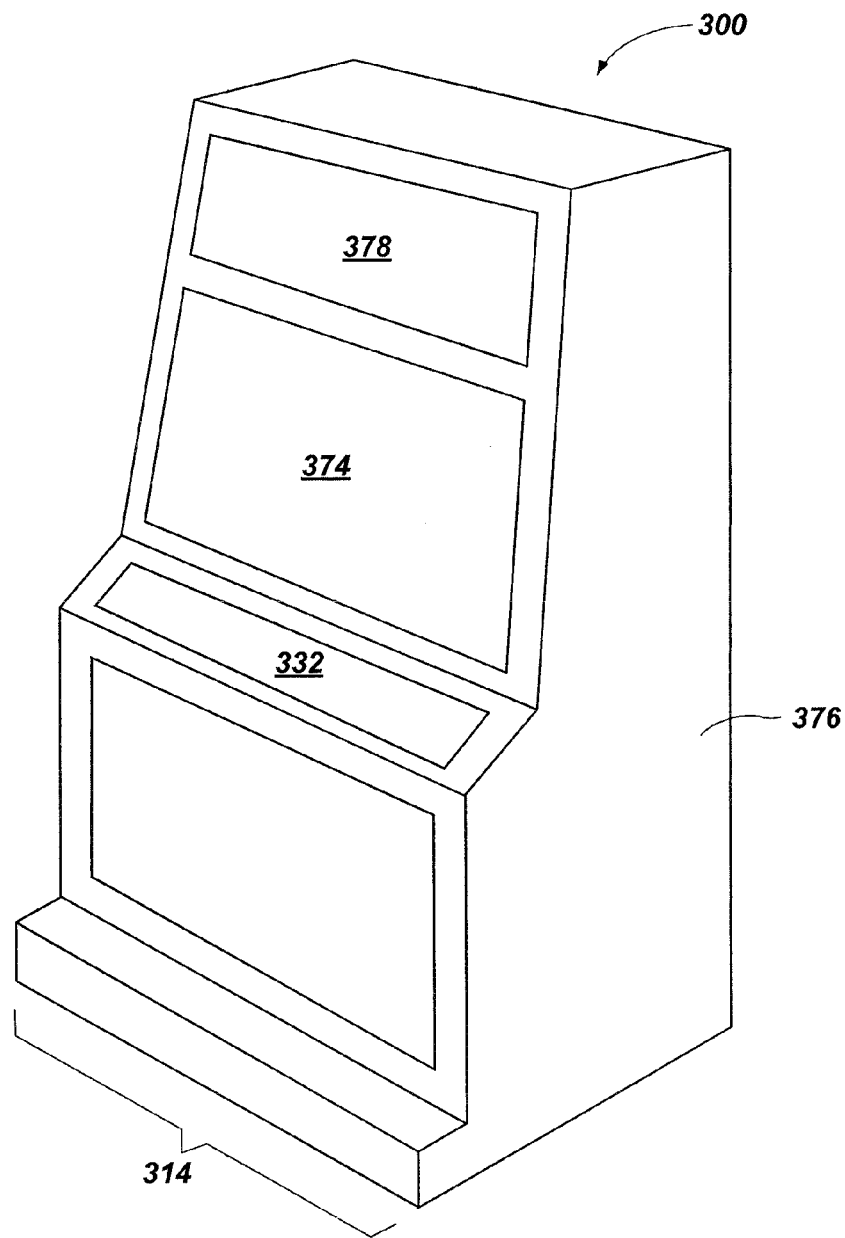
FIG. 3 is a perspective view of an individual electronic gaming device configured for implementation of embodiments of wagering games.

Referring to FIG. 3, an example of an individual electronic gaming device 300 configured for implementation of embodiments of wagering games according to the present disclosure is shown. The individual electronic gaming device 300 may include an individual player position 314 that includes a player input area 332 for a player to interact with the individual electronic gaming device 300. The electronic gaming device 300 may include a gaming screen 374 configured to display indicia for interacting with the individual electronic gaming device 300, such as through processing one or more programs stored in memory to implement the rules of game play at the individual electronic gaming device 300. Accordingly, game play may be accommodated without involving physical playing cards, poker chips, and/or live personnel. The action may instead be simulated by a control processor (not shown) interacting with and controlling the individual electronic gaming device 300. Although the figure has an outline of a traditional gaming cabinet, gaming device 300 may be implemented in any number of ways, including, but not limited to, client software downloaded to a portable device, such as a smartphone, tablet, or laptop personal computer. Gaming device 300 may also be a non-portable personal computer (e.g., a desktop or all-in-one computer) or other computing device. In some embodiments, client software is not downloaded but is native to the device, or otherwise delivered with the device when received by a player.

The gaming screen 374 may be carried by a generally vertically extending cabinet 376 of the individual electronic gaming device 300. The individual electronic gaming device 300 may further include banners (not shown) configured to communicate rules of game play and/or the like, such as along a top portion 378 of the cabinet 376 of the gaming device 300. The individual electronic gaming device 300 may further include additional decorative lights (not shown), and speakers (not shown) for transmitting and/or receiving sounds during game play. Further detail of an example of an individual electronic gaming device (as well as other embodiments of tables and devices) is disclosed in U.S. patent application Ser. No. 13/215,156, filed Aug. 22, 2011, and titled "Methods of Managing Play of Wagering Games and Systems for Managing Play of Wagering Games," the disclosure of which is incorporated herein in its entirety by this reference.

Some embodiments may be implemented at locations that include a plurality of player stations. Such player stations may include an electronic display screen for display of game information, such as displaying virtual cards, virtual chips, and game instructions, and for accepting wagers and facilitating credit balance adjustments. Such player stations may, optionally, be integrated in a table format, may be distributed throughout a casino or other gaming site, or may include both grouped and distributed player stations. While some features may be automated through electronic interfaces (e.g., virtual cards, virtual chips, etc.), some features may remain in the physical domain. As such, the game play may be administered by a live dealer, a virtual dealer, or a combination of both.

Figure 4:
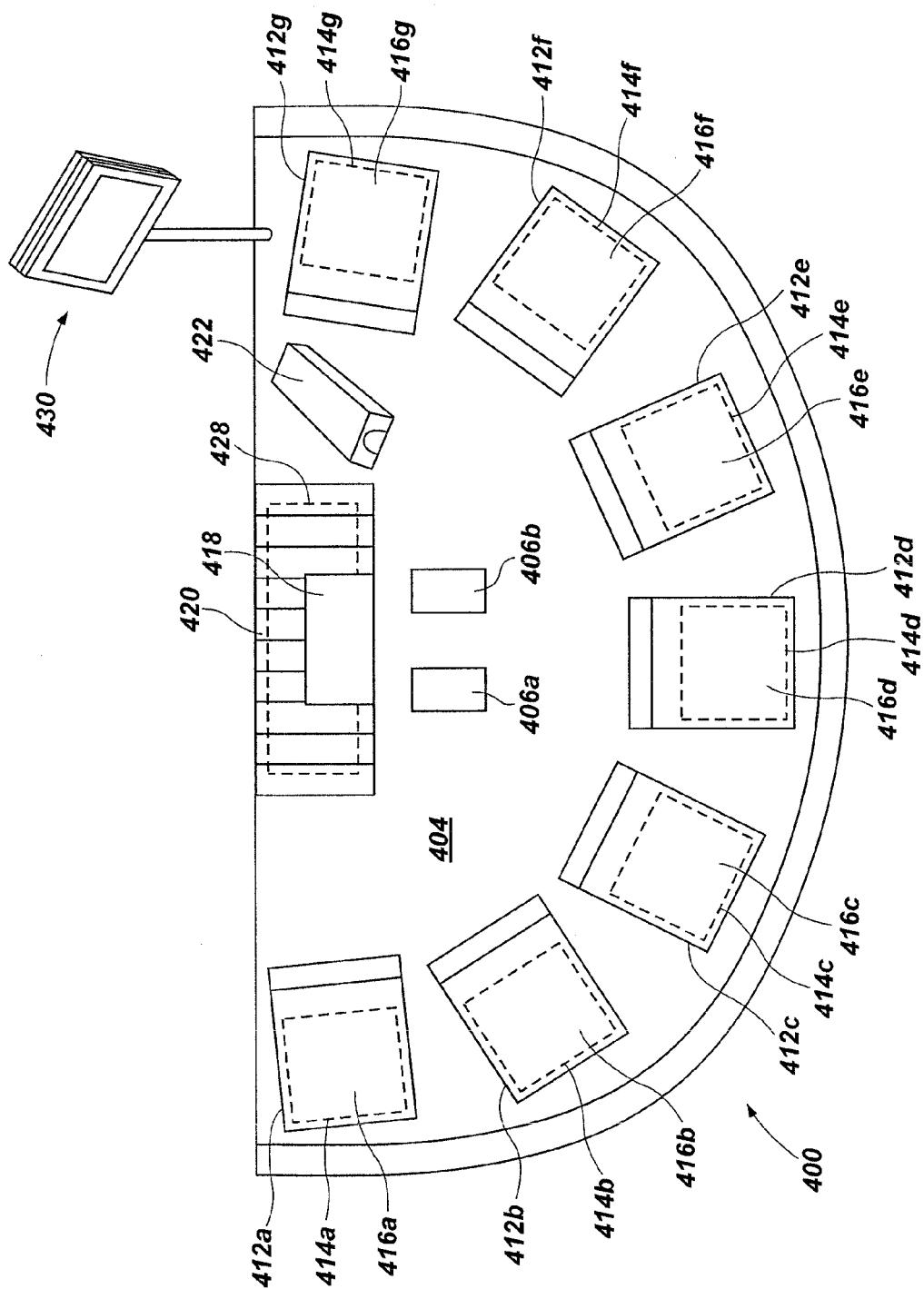
FIG. 4 is a top view of a suitable table configured for implementation of embodiments of wagering games.

Referring to FIG. 4, an example of a suitable table 400 configured for implementation of embodiments of wagering games according to the present disclosure is shown. The table 400 may include a playing surface 404. The table 400 may include a plurality of player stations 412a through 412g. Each player station 412a through 412g may include a player interface 416a through 416g, which may be used for displaying game information (e.g., game instructions, input options, wager information including virtual chips, game outcomes, etc.). The player interface 416a through 416g may include a display screen in the form of a touch screen, which may be at least substantially flush with the playing surface 404 in some embodiments. Each player interface 416a through 416g may be coupled respectively with its own game processor 414a through 414g (shown in dashed lines), although in some embodiments, a central game processor 428 (shown in dashed lines) may be employed and communicate directly to player interfaces 416a through 416g. In some embodiments, a combination of individual game processors 414a through 414g and a central game processor 428 may be employed.

The table 400 may further include additional features, such as a dealer chip tray 420, which may be used by the dealer to cash players in and out of the wagering game, whereas wagers and balance adjustments during game play may be performed using virtual chips. For embodiments using physical cards 406a and 406b, the table 400 may further include a card handling device 422 that may be configured to shuffle, read, and deliver physical cards for the dealer and players to use during game play or, alternatively, a card shoe configured to read and deliver cards that have already been randomized. For embodiments using virtual cards, such virtual cards may be displayed at the individual player interfaces 416a through 416g. Common virtual cards may be displayed in a common card area (not shown).

The table 400 may further include a dealer interface 418, which, like the player interfaces 414a through 414g, may include touch screen controls for assisting the dealer in administering the wagering game. The table 400 may further include an upright display 430 configured to display images that depict game information such as pay tables, hand counts, historical win/loss information by player, and a wide variety of other information considered useful to the players. The upright display 430 may be double sided to provide such information to players as well as to the casino pit.

Further detail of an example of a table and player displays is disclosed in U.S. Patent Application Pub. No. 2010/0016050, filed Jul. 15, 2008, now U.S. Pat. No. 8,262,475, issued Sep. 11, 2012, and titled "Chipless Table Split Screen Feature," the disclosure of which is incorporated herein in its entirety by this reference. Although an embodiment is described showing individual discrete player stations, in some embodiments, the entire playing surface 404 may be an electronic display that is logically partitioned to permit game play from a plurality of players for receiving inputs from, and displaying game information to, the players, the dealer, or both.

Figure 5:
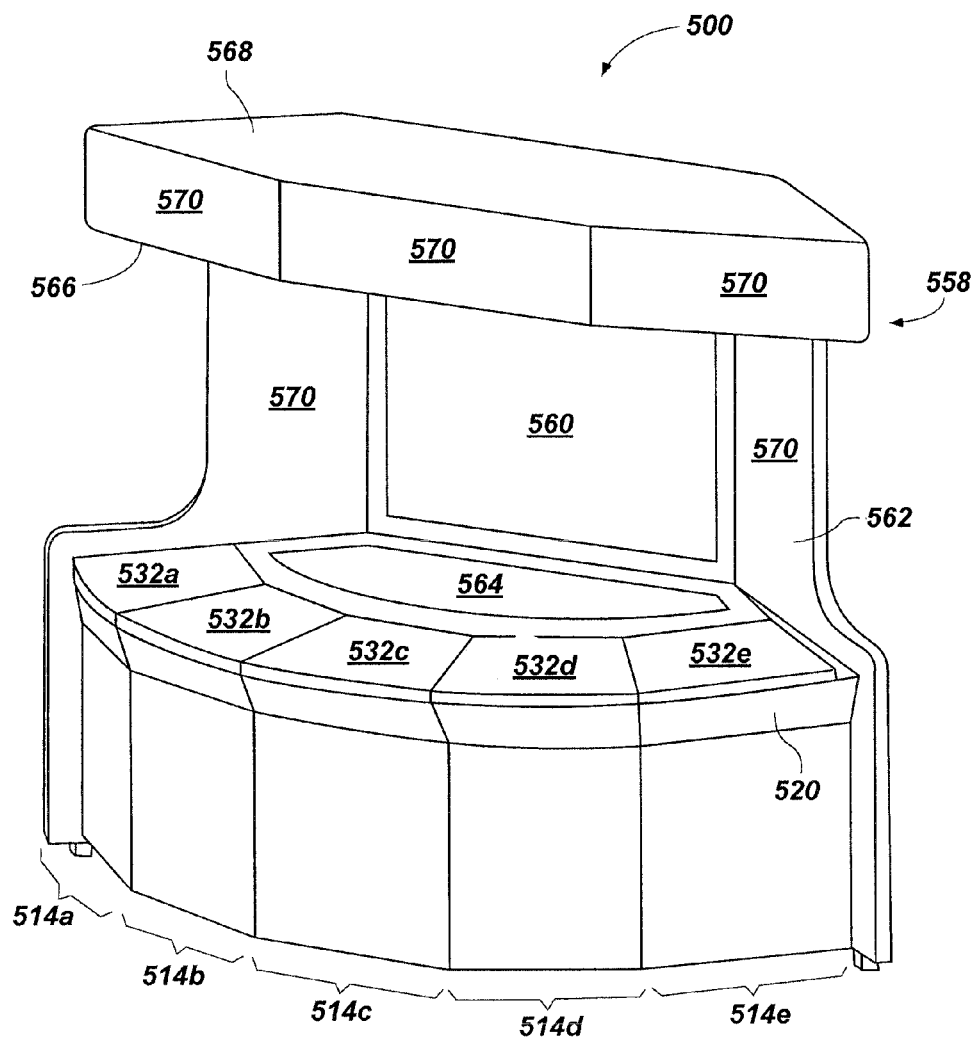
FIG. 5 is a perspective view of another embodiment of a suitable table configured for implementation of embodiments of wagering games having a virtual dealer.

Referring to FIG. 5, another example of a suitable table 500 configured for implementation of embodiments of wagering games having a virtual dealer according to the present disclosure is shown. The table 500 may include player positions 514a through 514e that are arranged in a bank about an arcuate edge 520 of a video device 558 that may comprise a card screen 564 and a dealer screen 560. The dealer screen 560 may display a video simulation of the dealer (i.e., a virtual dealer) for interacting with the video device 558, such as through processing one or more stored programs stored in memory to implement the rules of game play at the video device 558. The dealer screen 560 may be carried by a generally vertically extending cabinet 562 of the video device 558. The card screen 564 may be configured to display at least one or more of the dealer's cards, community cards, and/or player's cards by the virtual dealer on the dealer screen 560 (virtual dealer not shown in FIG. 5).

Each of the player positions 514a through 514e may include a player interface area 532a through 532e, which is configured for wagering and game play interactions with the video device 558 and/or virtual dealer. Accordingly, game play may be accommodated without involving physical playing cards, poker chips, and/or live personnel. The action may instead be simulated by a control processor (not shown) interacting with and controlling the video device 558. The control processor may be located internally within, or otherwise proximate to, the video device 558. The control processor may be programmed, by known techniques, to implement the rules of game play at the video device 558. As such, the control processor may interact and communicate with display/input interfaces and data entry inputs for each player interface area 532a through 532e of the video device 558. Other embodiments of tables and gaming devices may include a control processor that may be similarly adapted to the specific configuration of its associated device.

The video device 558 may further include banners (not shown) configured to communicate rules of play and/or the like, which may be located along one or more walls 570 of the cabinet 562. The video device 558 may further include additional decorative lights (not shown) and speakers (not shown), which may be located on an underside surface 566, for example, of a generally horizontally depending top 568 of the cabinet 562 of the video device 558 generally extending toward the player positions 514a through 514e.

Further detail of an example of a table and player displays is disclosed in U.S. Patent Application Pub. No. 2005/0164762, filed Jan. 26, 2004, now U.S. Pat. No. 8,272,958, issued Sep. 25, 2012, and titled "Automated Multiplayer Game Table with Unique Image Feed of Dealer," the disclosure of which is incorporated herein in its entirety by this reference. Although an embodiment is described showing individual discrete player stations, in some embodiments, the entire playing surface (e.g., player interface areas 532a through 532e, card display 564, etc.) may be an electronic display that is logically partitioned to permit game play from a plurality of players for receiving inputs from, and displaying game information to, the players, the dealer, or both.

Figure 6:
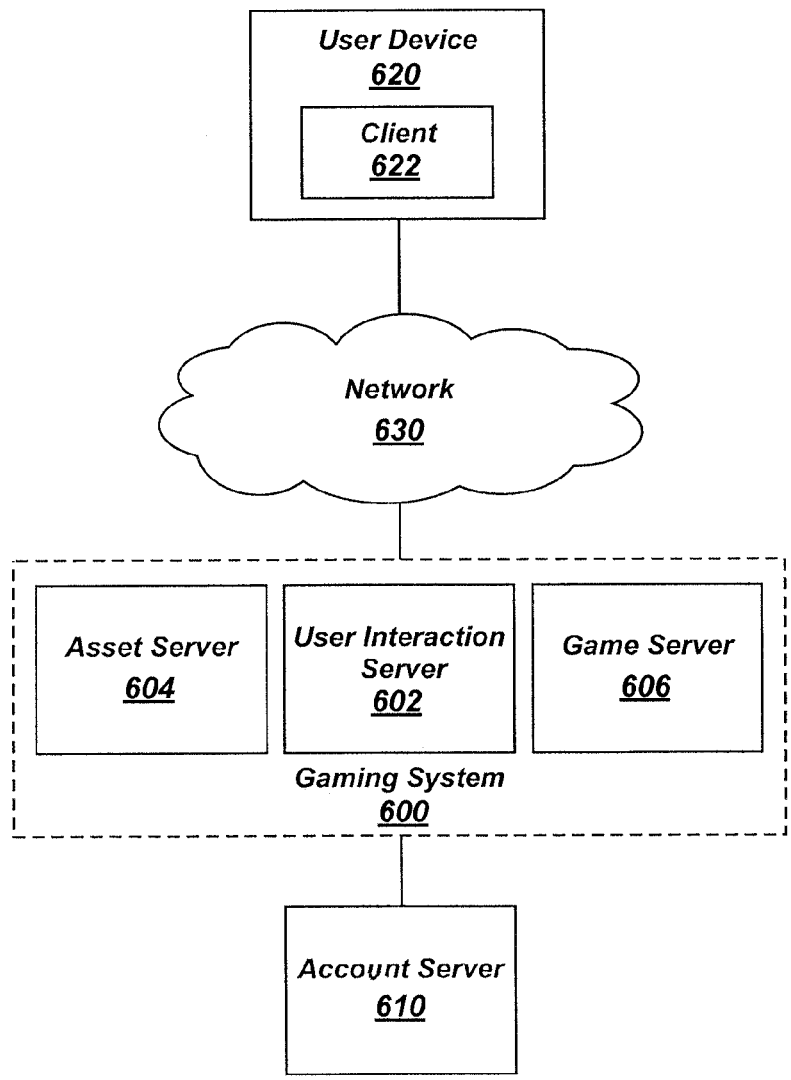
FIG. 6 is a schematic block diagram of a gaming system for implementing embodiments of waging games.

Wagering games in accordance with embodiments of the disclosure may be administered over the Internet, or otherwise online, in one embodiment using a gaming system employing a client server architecture. Referring to FIG. 6, a schematic block diagram of a gaming system 600 for implementing wagering games according to an embodiment is shown. The gaming system 600 enables end users to access proprietary and/or non-proprietary game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not be limited to, Class II and Class III games as defined under 25 U.S.C. §2701 et seq. ("Indian Gaming Regulatory Act"). Such games may include banked and/or non-banked games.

The wagering games supported by the gaming system 600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits, being awarded credits as part of a contest or a win event in this or another game (including non-wagering games), being awarded credits as a reward for use of a product, casino or other enterprise, time played in one session, games played, or may be as simple as virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This may attract players to the site and to the games before they engage in wagering. In some embodiments, a limited number of free or promotional credits may be issued to entice players to play the games. Another method of issuing credits includes free credits in exchange for identifying friends who may want to play. In another embodiment, additional credits may be issued after a period of time has elapsed to encourage the player to resume playing the game. The system may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 600 may include a gaming platform that establishes a portal for an end user to access a wagering game hosted by a game server 606 through a user interaction server 602. The user device 620 may communicate with a user interaction server 602 of the gaming system 600 using a network 630 (e.g., the Internet). The user interaction server 602 may communicate with the game server 606 and provide game information to the user. In some embodiments, the game server 606 may also be a game engine. In some embodiments, a single user device communicates with a game provided by the game server 606, while other embodiments may include a plurality of user devices 620 configured to communicate and provide end users with access to the same game provided by the game server 606. In addition, a plurality of end users may access a single user interaction server 602, or a plurality of user interaction servers 602, to access game server 606.

The user interaction server 602 may communicate with the user device 620 to enable access to the gaming system 600. The user interaction server 602 may enable a user to create and access a user account and interact with gaming server 606. The user interaction server 602 may enable users to initiate new games, join existing games, and interface with games being played by the user.

The user interaction server 602 may also provide a client 622 for execution on the user device 620 for accessing the gaming system 600. The client 622 provided by the gaming system 600 for execution on the user device 620 can comprise a variety of implementations according to the user device 620 and method of communication with the gaming system 600.

In one embodiment, the user device 620 connects to the gaming system 600 using a web browser and the client 622 executes within a browser window or frame of the web browser. In another embodiment, the client 622 is a stand-alone executable on the user device 620.

In one embodiment, the client 622 may comprise a relatively small amount of script (e.g., JAVASCRIPT®), also referred to as a "script driver," including scripting language that controls an interface of the client 622. The script driver may include simple function calls requesting information from the gaming system 600. In other words, the script driver stored in the client 622 may merely include calls to functions that are externally defined by, and executed by, the gaming system 600. As a result, the client 622 may be characterized as a "thin client." As that term is used herein, the client 622 may be little more than a script player. The client 622 may simply send requests to the gaming system 600 rather than performing logic itself. The client 622 receives player inputs and the player inputs are passed to gaming system 600 for processing and executing the wagering game. In one embodiment, this includes providing specific graphical display information to client 622, as well as game outcomes.

In other embodiments, the client 622 comprises an executable file rather than a script. In that case, client 622 may do more local processing than does a script driver, such as calculating where to show what game symbols upon receiving a game outcome from game server 606 through user interaction server 602. In one embodiment, it may be that portions of asset server 604 are loaded onto the client 622, and used by the client 622 in processing and updating graphical displays. Due to security and integrity concerns, most embodiments will have the bulk of the processing of the game play performed in the gaming system 600. However, some embodiments may include significant game processing by client 622 when the client and user device 620 are considered trustworthy or when there is reduced concern for security and integrity in the displayed game outcome. In most embodiments, it is expected that some form of data protection, such as end-to-end encryption, will be used when data is transported over network 630. Network 630 may be any network, including, but not limited to, the Internet.

In an embodiment where the client 622 implements further logic and game control methodology beyond a thin client, the client 622 may parse and define player interactions prior to passing the player interactions to the gaming system 600. Likewise, when the client 622 receives a gaming interaction from the gaming system 600, the client 622 may be configured to determine how to modify the display as a result of the gaming interaction. The client 622 may also allow the player to change a perspective or otherwise interact with elements of the display which do not change aspects of the game.

The gaming system 600 may include an asset server 604, which may host various media assets (e.g., audio, video, and image files) that may be sent to the client 622 for presenting the various wagering games to the end user. In other words, in this embodiment the assets presented to the end user may be stored separately from the client 622. In one embodiment, the client 622 requests the assets appropriate for the game played by the user; in other embodiments, especially those using thin clients, just those assets that are needed for a particular display event will be sent by game server 600 when the game server 600 determines they are needed, including as few as one asset. In one example, the client 622 may call a function defined at the user interaction server 602 or asset server 604, which may determine which assets are to be delivered to the client 622 as well as how the assets are to be presented by the client 622 to the end user. Different assets may correspond to the various clients that may have access to the game server 606 or to different games to be played.

The game server 606 is configured to perform game play methods and determine game play outcomes that are provided to the user interaction server 602 to be transmitted to user device 620 for display on the end user's computer. For example, the game server 606 may include game rules for one or more wagering games, such that the game server 606 controls some or all of the game flow for a selected wagering game, as well as determining game outcomes. Game server 606 may include pay tables and other game logic. The game server 606 also performs random number generation for determining random game elements of the wagering game. In one embodiment, the game server 606 is separated from the user interaction server 602 by a firewall or other method of preventing unauthorized access to the game server 606 from the general members of the network 630.

The user device 620 may present a gaming interface to the player and communicate the user interaction to the gaming system 600. The user device 620 may be any electronic system capable of displaying gaming information, receiving user input, and communicating the user input to the gaming system 600. As such, the user device 620 can be a desktop computer, a laptop, a tablet computer, a set-top box, a mobile device, including, but not limited to, smartphones, a kiosk, a terminal, or another computing device. The user device 620 operating the client 622 may comprise an interactive electronic gaming system 300 (see FIG. 3), as described above. The client 622 may be a specialized application or may be executed within a generalized application capable of interpreting instructions from the interactive gaming system 600, such as a web browser.

The client 622 may interface with an end user through a web page, or an application that runs on a device, including, but not limited to, a smartphone, a tablet, or a general computer, or be any other computer program configurable to access the gaming system 600. The client 622 may be illustrated within a casino webpage (or other interface) indicating that the client 622 is embedded into a webpage, which is supported by a web browser executing on the user device 620.

In one embodiment, the gaming system 600 may be operated by different entities. The user device 620 may be operated by a third party, such as a casino or an individual, that links to the gaming system 600, which may be operated, for example, by a wagering game service provider. Therefore, in some embodiments, the user device 620 and client 622 may be operated by a different administrator than the operator of the game server 606. In other words, the user device 620 may be part of a third-party system that does not administer or otherwise control the gaming system 600 or game server 606. In another embodiment, the user interaction server 602 and asset server 604 are provided by a third-party system. For example, a gaming entity (e.g., a casino) may operate the user interaction server 602 or user device 620 to provide its customers access to game content managed by a different entity, which may control game server 606, amongst other functionality. In some embodiments, these functions are operated by the same administrator. For example, a gaming entity (e.g., a casino) may elect to perform each of these functions in-house, such as providing both the access to the user device 620 and the actual game content and providing administration of the gaming system 600.

The gaming system 600 may communicate with external account servers 610, optionally through another firewall. For example, the gaming system 600 itself may not directly accept wagers or issue payouts. That is, the gaming system 600 may facilitate online casino gaming, but may not be part of a self-contained online casino itself. Instead, the gaming system 600 may facilitate the play of wagering games owned and controlled by a company offering games and gaming products and services, such as Bally Gaming, Inc. Another entity (e.g., a casino or any account holder or financial system of record) may operate and maintain its external account servers 610 to accept bets and make payout distributions. The gaming system 600 may communicate with the account servers 610 to verify the existence of funds for wagering, and instruct the account server 610 to execute debits and credits.

In some embodiments, the gaming system 600 may directly accept bets and make payout distributions, such as in the case where an administrator of the gaming system 600 operates as a casino. As discussed above, the gaming system 600 may be integrated within the operations of a casino rather than separating out functionality (e.g., game content, game play, credits, debits, etc.) among different entities. In addition, for play-for-fun wagering games, the gaming system 600 may issue credits, take bets, and manage the balance of the credits according to the game outcomes, but may not permit payout distributions or be linked to an account server 610 that permits payout distributions. Such credits may be issued for free, through purchase, or for other reasons, without the ability for the player to cash out. Such play-for-fun wagering games may be played on platforms that do not permit traditional gambling, such as to comply with jurisdictions that do not permit online gambling.

The gaming system 600 may be configured in many ways, from a fully integrated single system to a distributed server architecture. The asset server 604, user interaction server 602, game server 606, and account server 610 may be configured as a single, integrated system of code modules running on a single server or machine, where each of the servers is functionally implemented on a single machine. In such a case, the functionality described herein may not be implemented as separate code modules. The asset server 604, user interaction server 602, game server 606, and account server 610 may also be implemented as a plurality of independent servers, each using its own code modules running on a separate physical machine, and may further include one or more firewalls between selected servers (depending on security needs). Each server could communicate over some kind of networked connection, potentially as varied as that described for network 630. Further, each single server shown in FIG. 6 may be implemented as a plurality of servers with load balancing and scalability factors built into the embodiment. All such embodiments and variations are fully contemplated.

Additional features may be supported by the game server 606, such as hacking and cheating detection, data storage and archival, metrics generation, messages generation, output formatting for different end user devices, as well as other features and operations. For example, the gaming system 600 may include additional features and configurations as described in U.S. patent application Ser. No. 13/353,194, filed Jan. 18, 2012, now U.S. Pat. No. 9,120,007, issued Sep. 1, 2015, and application Ser. No. 13/609,031, filed Sep. 10, 2012, now U.S. Pat. No. 8,974,305, issued Mar. 10, 2015, both titled "Network Gaming Architecture, Gaming Systems, and Related Methods," the disclosures of which are incorporated herein in its entirety by their reference.

The network 630 may enable communications between the user device 620 and the gaming system 600. A network (not shown) may also connect the gaming system 600 and account server 610, and, further, one or more networks (not shown) may interconnect one or more of the other servers shown collectively as game system 600. In one embodiment, the network 630 uses standard communications technologies and/or protocols. Thus, the network 630 can include links using technologies such as Ethernet, 802.11, worldwide interoperability for microwave access (WiMAX), 3G, digital subscriber line (DSL), asynchronous transfer mode (ATM), INFINIBAND®, PCI Express Advanced Switching, etc. Similarly, the networking protocols used on the network 630 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 630 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 630 can include links comprising one or more networks such as the Internet.

Figure 7:
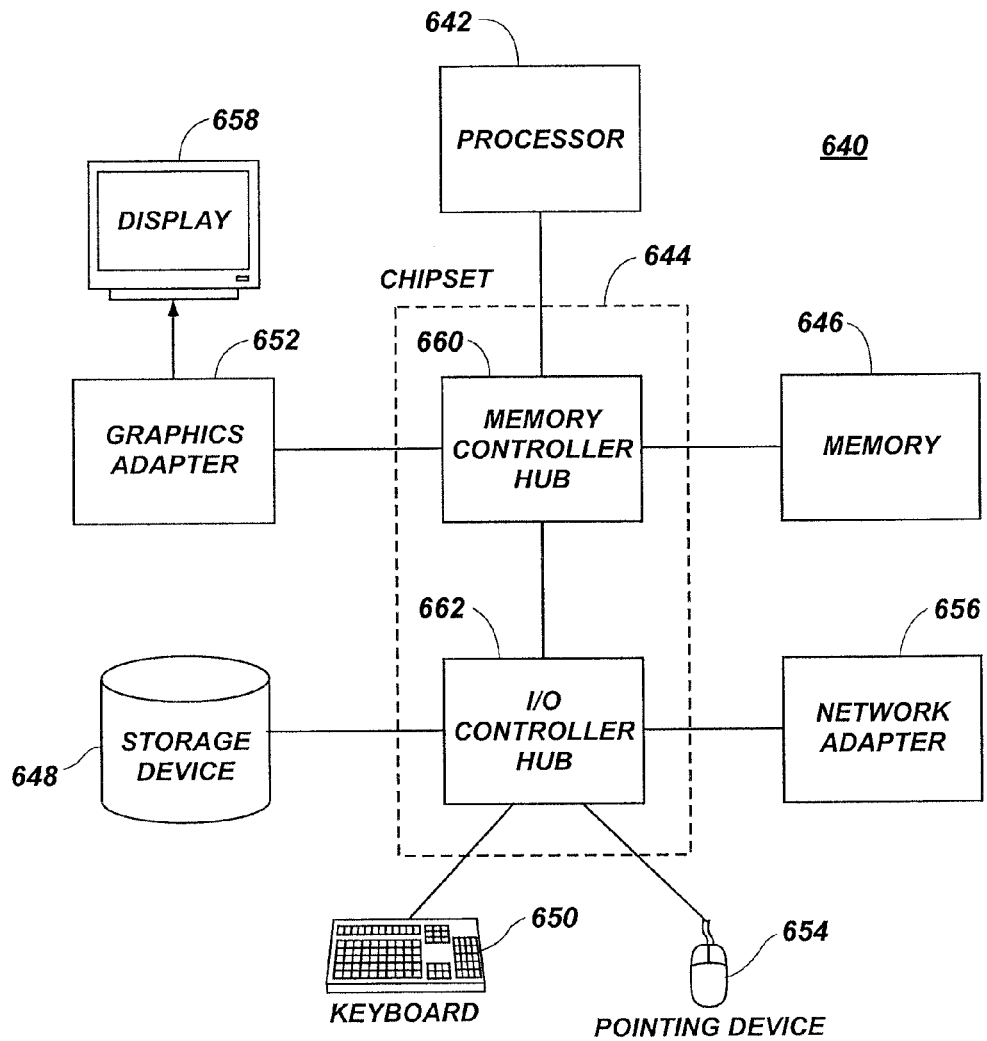
FIG. 7 is a block diagram of a computer for acting as a gaming system according to one embodiment.

Referring to FIG. 7, a high-level block diagram of a computer system 640 for acting as a gaming system 600 (see FIG. 6) according to one embodiment is shown. Illustrated are at least one processor 642 coupled to a chipset 644, as indicated in dashed lines. Also coupled to the chipset 644 are a memory 646, a storage device 648, a keyboard 650, a graphics adapter 652, a pointing device 654, and a network adapter 656. A display 658 is coupled to the graphics adapter 652. In one embodiment, the functionality of the chipset 644 is provided by a memory controller hub 660 and an I/O controller hub 662. In another embodiment, the memory 646 is coupled directly to the processor 642 instead of the chipset 644.

The storage device 648 is any non-transitory computer-readable storage medium, such as a hard drive, a compact disc read-only memory (CD-ROM), DVD, or a solid-state memory device (e.g., a flash drive). The memory 646 holds instructions and data used by the processor 642. The pointing device 654 may be a mouse, a track pad, a track ball, or other type of pointing device, and is used in combination with the keyboard 650 to input data into the computer system 640. The graphics adapter 652 displays images and other information on the display 658. The network adapter 656 couples the computer system 640 to a local or wide area network.

As is known in the art, a computer system 640 can have different and/or other components than those shown in FIG. 7. In addition, the computer system 640 can lack certain illustrated components. In one embodiment, a computer system 640 acting as a gaming system 600 lacks a keyboard 650, pointing device 654, graphics adapter 652, and/or display 658. Moreover, the storage device 648 can be local and/or remote from the computer system 640 (such as embodied within a storage area network (SAN)).

The gaming system 600 may comprise several such computer systems 640. The gaming system 600 may include load balancers, firewalls, and various other components for assisting the gaming system 600 to provide services to a variety of user devices.

As is known in the art, the computer system 640 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 648, loaded into the memory 646, and executed by the processor 642.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Although specific rules, steps, numbers of cards and the like have been presented at various points in this disclosure, those specific examples are not intended to limit the generic concepts disclosed and described herein. Those examples are not intended to be limiting, but supportive of the generic concepts disclosed and claimed.

What is claimed is:

1. An automated table system for administering a wagering game, comprising:
  at least one display screen configured to display wagers placed by each player participating in the wagering game at the automated table system;
  at least one player input device configured to accept a physical item associated with monetary value, the monetary value establishing a credit balance for a corresponding participating player; and
  at least one processor operatively connected to the at least one display screen and the at least one player input device, the at least one processor being configured to administer a wagering game using the at least one display screen and the at least one player input device by being programmed to:
    receive, via the at least one player input device, a wager input indicative of an ante wager amount committed from the credit balance associated with the corresponding participating player, the ante wager amount being displayed on at least one of the at least one display screen;
    display three player cards comprising a partial hand particular to each player on at least one of the at least one display screen, which player cards are available to respective players individually;
    receive from each respective player, via at least one of the at least one player input device, an election to fold wherein a wagering element associated with the ante wager of the respective player is collected and subsequent wagers from the respective player during the wagering game are not accepted, or an election to place a play wager equal to an integer multiple of the ante wager to continue participation in the wagering game wherein the play wager is at a maximum acceptable value of four times the ante wager amount;
    receive from at least one respective player, via at least one of the at least one player input device, a poker wager indicating an allocation of funds from the credit balance is authorized by the respective player;
    authorize, via the at least one processor, transfer of a rake from each ante wager and the play wager to a house account, transfer of a remainder of each ante wager and a remainder of the play wager to a game pot, and transfer of the poker wager to a poker pot, the poker pot and the game pot being separate;

display two additional community cards available to all players on the at least one display screen to complete a five-card poker hand of each player; and resolve the ante and play wagers, authorize paying a payout of at least a portion of the game pot to each player holding a complete five-card poker hand ranked at a predetermined rank of a pair of jacks or higher, authorize paying at least a portion of the poker pot to a player who did not fold holding a highest-ranked, five-card poker hand when compared to ranks of the five-card poker hands of each other player who did not fold, and authorize collecting the ante and play wagers of each player holding a complete hand ranked lower than the predetermined rank, wherein the payout is added to the respective credit balance of each player holding the complete hand ranked at or higher than the predetermined rank.

2. The automated table system of claim 1, wherein the at least one processor is further programmed to:

receive a bonus wager from at least one player via the at least one player input device before displaying the three player cards; and resolve the bonus wager and authorize paying a payout to the at least one player when the at least one player holds a partial hand forming a three-card poker hand ranked a pair or higher and composed solely of the three player cards initially dealt to the at least one player, wherein the payout is added to the credit balance of the at least one player.

3. The automated table system of claim 1, wherein the at least one processor is further programmed to:

authorize paying a payout of the ante wager to the respective credit balance of each player holding the complete hand ranked between a pair of sixes and a pair of tens.

4. The automated table system of claim 1, wherein the at least one processor is further programmed to:

authorize paying a payout to the credit balance associated with each player holding the complete hand ranked at the predetermined rank or higher a first payout according to a pay table, with increasing amounts being paid for increasingly unlikely hands.

5. The automated table system of claim 1, wherein the at least one processor is further programmed to:

receive from at least one respective player, via at least one of the at least one player input device, an additional wager; and in response to the partial hand composed solely of the cards initially dealt to the at least one respective player ranked at an additional predetermined rank or higher, resolve the additional wager by paying an additional payout to the at least one respective player.

6. The automated table system of claim 5, wherein the additional predetermined rank is a pair.

7. The automated table system of claim 5, wherein paying the additional payout to the at least one respective player occurs even if the at least one respective player made the election to fold.

* * * * *